US012695610B2

(12) United States Patent
Liu et al.

(10) Patent No.: US 12,695,610 B2
(45) Date of Patent: Jul. 28, 2026

(54) BLOCKCHAIN DATA PROCESSING METHOD AND APPARATUS, COMPUTER DEVICE, MEDIUM, AND PRODUCT

(71) Applicant: Tencent Technology (Shenzhen) Company Limited, Shenzhen (CN)

(72) Inventors: Hanqing Liu, Shenzhen (CN); Zongyou Wang, Shenzhen (CN); Hu Lan, Shenzhen (CN); Yifang Shi, Shenzhen (CN); Gengliang Zhu, Shenzhen (CN); Qucheng Liu, Shenzhen (CN); Zhiyong Liao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 239 days.

(21) Appl. No.: 18/527,264

(22) Filed: Dec. 2, 2023

(65) Prior Publication Data

US 2024/0097898 A1 Mar. 21, 2024

Related U.S. Application Data

(63) Continuation of application No. PCT/CN2023/108532, filed on Jul. 21, 2023.

(30) Foreign Application Priority Data

Aug. 4, 2022 (CN) .......................... 202210935349.9

(51) Int. Cl.
| | |
|---|---|
| *H04L 9/08* | (2006.01) |
| *H04L 9/00* | (2022.01) |
| *H04L 9/30* | (2006.01) |

(52) U.S. Cl.
CPC .......... *H04L 9/0891* (2013.01); *H04L 9/0825* (2013.01); *H04L 9/3066* (2013.01); *H04L 9/50* (2022.05)

(58) Field of Classification Search
CPC ... H04L 9/0891; H04L 9/0825; H04L 9/3066; H04L 9/50; H04L 9/0841; H04L 67/1074;
(Continued)

(56) References Cited

U.S. PATENT DOCUMENTS

| | | | | |
|---|---|---|---|---|
| 9,722,974 B1 * | 8/2017 | Fuller | .................. | H04L 9/0836 |
| 2018/0295115 A1 * | 10/2018 | Kumar | ................ | H04L 63/0428 |

FOREIGN PATENT DOCUMENTS

| | | | | |
|---|---|---|---|---|
| CN | 112073196 A | * 12/2020 | ......... | H04L 63/0428 |
| KR | 20100127157 A | * 12/2010 | ........... | H04L 9/0891 |

* cited by examiner

*Primary Examiner* — Mohammed Waliullah
(74) *Attorney, Agent, or Firm* — ARENTFOX SCHIFF LLP

(57) ABSTRACT

In a blockchain data processing method, service updating data of each of a plurality of encrypted data is received. The service updating data of each of the plurality of encrypted data includes encrypted primary key information of the respective encrypted data. Each of the plurality of encrypted data includes service data encrypted by a respective service node of a plurality of service nodes. Service intersection data is generated based on a data intersection of the service updating data of the plurality of encrypted data. The service intersection data is transmitted to a service node of the plurality of service nodes. The service intersection data includes supplemental text data from another service node of the plurality of service nodes.

20 Claims, 7 Drawing Sheets

(58)  Field of Classification Search
CPC ............. H04L 67/1097; H04L 63/0428; H04L
67/1078; Y02D 10/00
See application file for complete search history.

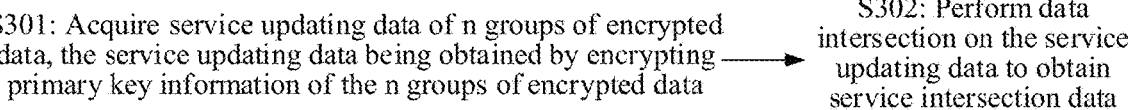

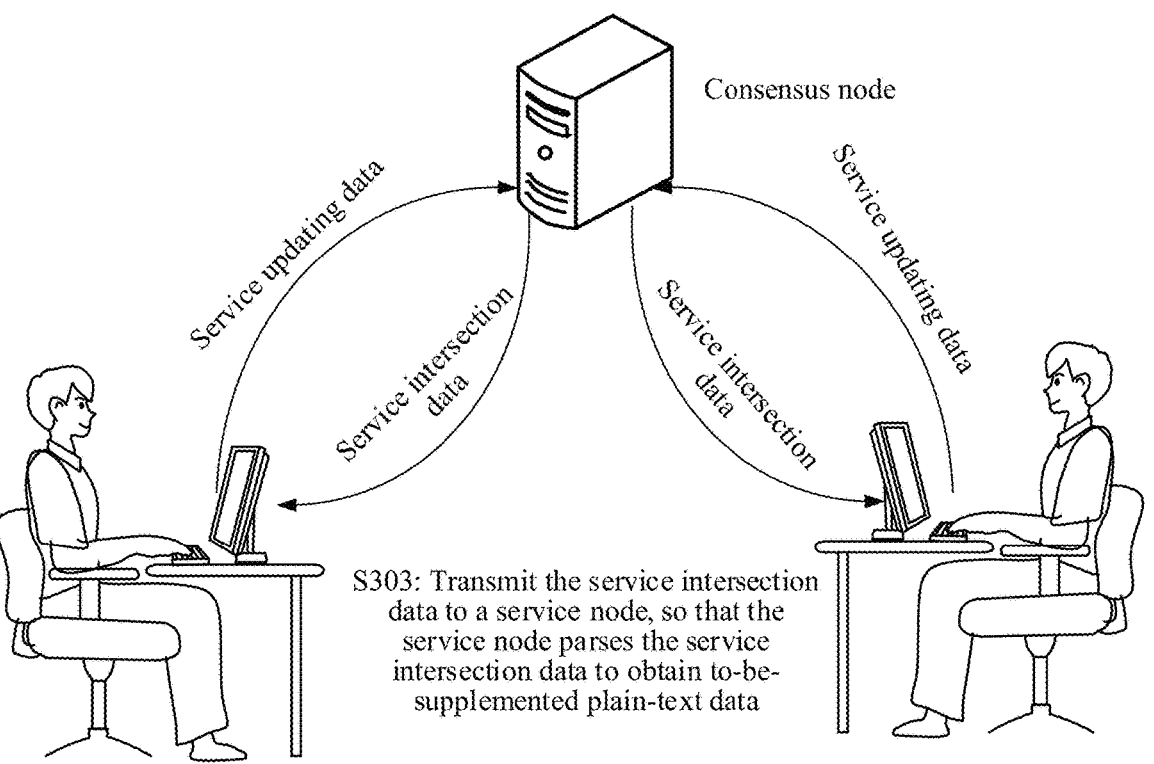

S301: Acquire service updating data of n groups of encrypted data, the service updating data being obtained by encrypting primary key information of the n groups of encrypted data →

S302: Perform data intersection on the service updating data to obtain service intersection data Consensus node Service updating data Service updating data Service intersection data Service intersection data S303: Transmit the service intersection data to a service node, so that the service node parses the service intersection data to obtain to-be-supplemented plain-text data First service node Second service node

FIG. 3

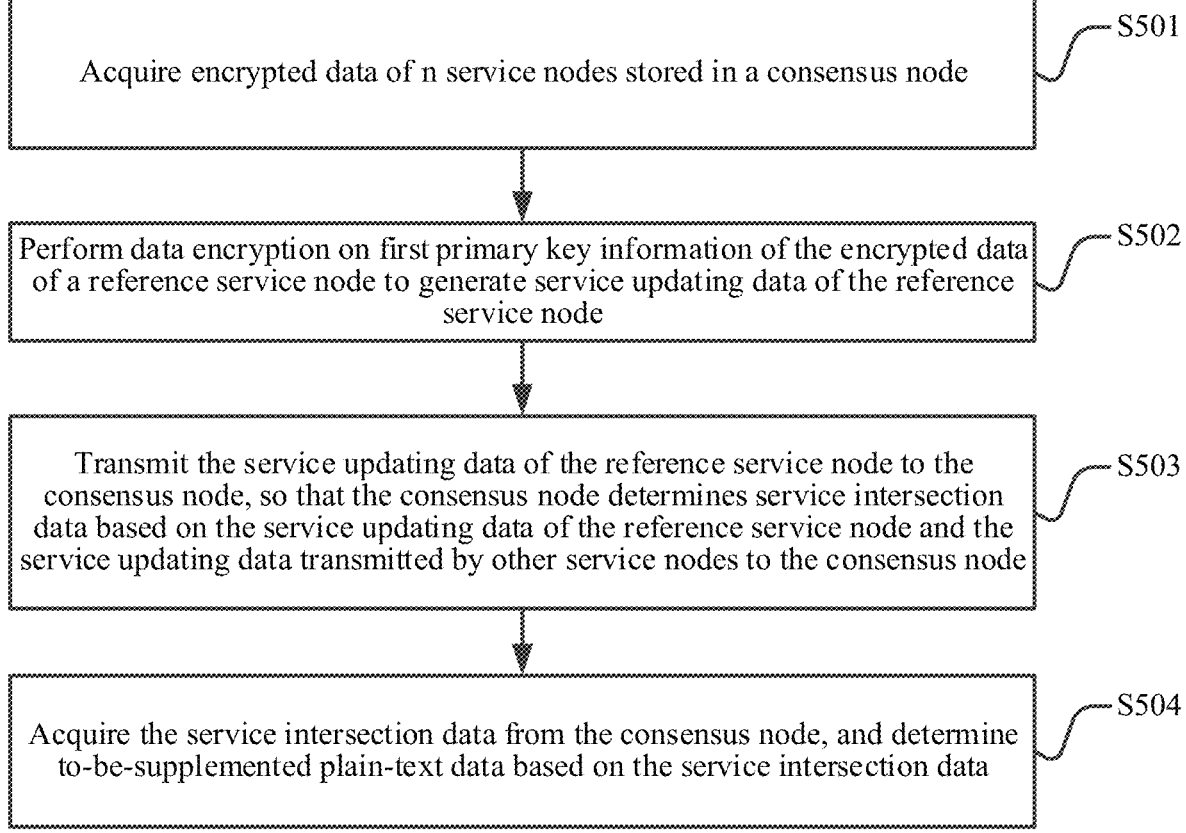

Acquire encrypted data of n service nodes stored in a consensus node          S501

Perform data encryption on first primary key information of the encrypted data of a reference service node to generate service updating data of the reference service node          S502

Transmit the service updating data of the reference service node to the consensus node, so that the consensus node determines service intersection data based on the service updating data of the reference service node and the service updating data transmitted by other service nodes to the consensus node          S503

Acquire the service intersection data from the consensus node, and determine to-be-supplemented plain-text data based on the service intersection data          S504

FIG. 5

Blockchain data processing apparatus 700

Blockchain data processing apparatus 800

1

BLOCKCHAIN DATA PROCESSING METHOD AND APPARATUS, COMPUTER DEVICE, MEDIUM, AND PRODUCT

RELATED APPLICATIONS

This application is a continuation of International Application No. PCT/CN2023/108532, filed on Jul. 21, 2023, which claims priority to Chinese Patent Application No. 202210935349.9, entitled "BLOCKCHAIN DATA PROCESSING METHOD AND APPARATUS, COMPUTER DEVICE, MEDIUM, AND PRODUCT" filed on Aug. 4, 2022. The entire disclosures of the prior applications are hereby incorporated by reference.

FIELD OF THE TECHNOLOGY

This disclosure relates to the field of blockchain technologies, including to a blockchain data processing method and apparatus, a computer device, a medium, and a product.

BACKGROUND OF THE DISCLOSURE

In an era of big data with advanced Internet technology, data exchange between different service nodes exists in various service scenarios. For example, a service node 1 may acquire data A and data B of a service 1, and data of a service 2, and a service node 2 may acquire the data A and data C of the service 1, and data of a service 3. Because there is the common service 1, there is need of data exchange between the service node 1 and the service node 2 in some cases, so that each can obtain more complete data about the service 1, that is, the data A, the data B, and the data C can be acquired from both the service node 1 and the service node 2.

SUMMARY

An embodiment of this disclosure provides a blockchain data processing method and apparatus, a computer device, a non-transitory computer-readable storage medium, and a product, which may complete a data exchange function of same data service more rapidly in a way of performing intersection on a primary key.

In an aspect, an embodiment of this disclosure provides a blockchain data processing method. In the blockchain data processing method, service updating data of each of a plurality of encrypted data is received. The service updating data of each of the plurality of encrypted data includes encrypted primary key information of the respective encrypted data. Each of the plurality of encrypted data includes service data encrypted by a respective service node of a plurality of service nodes. Service intersection data is generated based on a data intersection of the service updating data of the plurality of encrypted data. The service intersection data is transmitted to a service node of the plurality of service nodes. The service intersection data includes supplemental text data from another service node of the plurality of service nodes.

In an aspect, an embodiment of this disclosure provides a blockchain data processing method. In the blockchain data processing method, encrypted data of a reference service node of a plurality of service nodes is received. Data encryption is performed on primary key information of the encrypted data of the reference service node to generate service updating data of the reference service node. The service updating data of the reference service node is transmitted to a consensus node. Service intersection data is received from the consensus node. The service intersection data is determined based on the service updating data of the reference service node and service updating data of another service node of the plurality of service nodes. Supplemental text data is determined from the reference service node based on the service intersection data.

In an aspect, an embodiment of this disclosure provides a blockchain data processing method; the method is executed by a blockchain data processing system; and the blockchain data processing system includes a consensus node and n service nodes, where n is a positive integer greater than 1. In the method, n groups of encrypted data are acquired by n service nodes from the consensus node, the n groups of encrypted data being obtained by encrypting service data by the n service nodes. Service updating data of the n groups of encrypted data are transmitted, by the n service nodes, to the consensus node. The service updating data is obtained by encrypting primary key information of the n groups of encrypted data. Data intersection is performed by the consensus node on the service updating data to obtain service intersection data. The service intersection data is acquired by the n service nodes from the consensus node. To-be-supplemented plain-text data is determined based on the service intersection data, the to-be-supplemented plain-text data being data that the n service nodes lack.

In an aspect, an embodiment of this disclosure provides a blockchain data processing apparatus. The apparatus includes a consensus node in a blockchain, for example. The blockchain data processing apparatus includes processing circuitry that is configured to receive service updating data of each of a plurality of encrypted data, the service updating data of each of the plurality of encrypted data including encrypted primary key information of the respective encrypted data, each of the plurality of encrypted data including service data encrypted by a respective service node of a plurality of service nodes. The processing circuitry is configured to generate service intersection data based on a data intersection of the service updating data of the plurality of encrypted data. The processing circuitry is configured to transmit the service intersection data to a service node of the plurality of service nodes, the service intersection data including supplemental text data from another service node of the plurality of service nodes.

In an aspect, an embodiment of this disclosure provides a blockchain data processing apparatus. The apparatus includes a target service node among n service nodes, for example. The blockchain data processing apparatus includes processing circuitry that is configured to receive encrypted data of a reference service node of a plurality of service nodes. The processing circuitry is configured to perform data encryption on primary key information of the encrypted data of the reference service node to generate service updating data of the reference service node. The processing circuitry is configured to transmit the service updating data of the reference service node to a consensus node. The processing circuitry is configured to receive service intersection data from the consensus node, the service intersection data being determined based on the service updating data of the reference service node and service updating data of another service node of the plurality of service nodes. The processing circuitry is configured to determine supplemental text data from the reference service node based on the service intersection data.

In an aspect, an embodiment of this disclosure provides a computer device; the computer device includes a memory and a processor; and the memory stores a computer program, and the computer program, when executed by the processor, causes the processor to execute oen or more of the blockchain data processing methods.

In an aspect, an embodiment of this disclosure provides a non-transitory computer-readable storage medium, the computer-readable storage medium storing a computer program, the computer program, when read and executed by a processor of the computer device, causes the computer device to execute one or more of the blockchain data processing methods.

In an aspect, an embodiment of this disclosure provides a computer program product or a computer program, the computer program product or the computer program including a computer instruction, the computer instruction being stored in a computer-readable storage medium. A processor of the computer device reads the computer instruction from the computer-readable storage medium, and the processor executes the computer instruction to cause the computer device to execute one or more of the blockchain data processing methods.

BRIEF DESCRIPTION OF THE DRAWINGS

FIG. 3 is a flowchart of a blockchain data processing method according to an embodiment of this disclosure.

FIG. 5 is a flowchart of another blockchain data processing method according to an embodiment of this disclosure.

DESCRIPTION OF EMBODIMENTS

Figure 1:
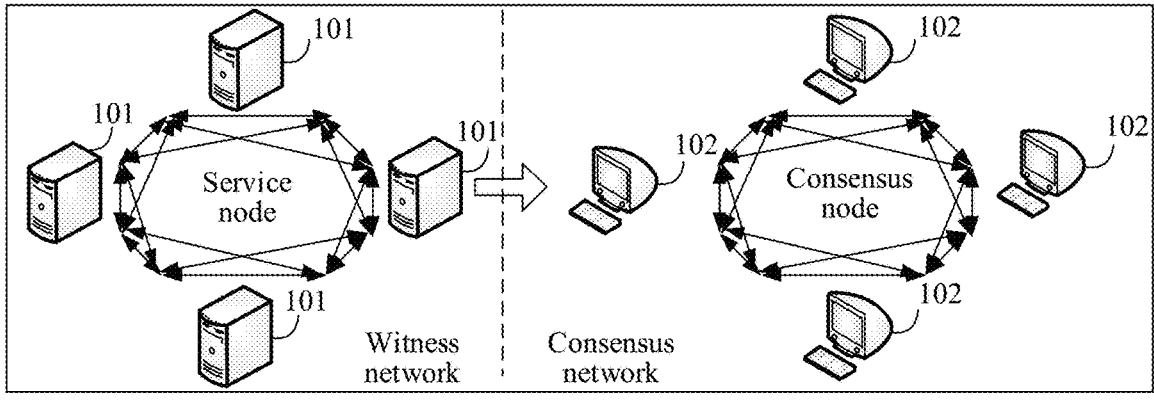
FIG. 1 is a schematic structural diagram of a blockchain data processing system according to an embodiment of this disclosure.

An embodiment of this disclosure provides a blockchain data processing solution, which can perform intersection on encrypted data of a plurality of service nodes on a blockchain, thereby ensuring the reliability and privacy of service intersection data. A principle of the blockchain data processing solution is as follows: a consensus node stores n groups of encrypted data generated by n service nodes. Any group of encrypted data is obtained after the service node encrypts the service data through a secret key. That is, any group of encrypted data is determined by encrypting the service data based on the secret key of the corresponding service node. The service data is constructed based on a key-value pair. The service nodes are in one-to-one correspondence to the encrypted data. n is a positive integer greater than 1. Firstly, the consensus node may acquire service updating data of the n groups of encrypted data. The service updating data is obtained by encrypting primary key information of the n groups of encrypted data. The consensus node performs data intersection according to the service updating data so as to obtain service intersection data. Finally, the consensus node may transmit the service intersection data to the service node to cause the service node to parse the service intersection data to obtain corresponding to-be-supplemented plain-text data, and the to-be-supplemented plain-text data is data that the service node lacks.

Thus, it may be seen that for the service data constructed based on the key-value pair, and after the primary key information is encrypted and updated, intersection is performed on the service updating data after the encrypted data is updated, which may ensure that the intersection is performed on the service data of different service nodes, so that each service node may share respective to-be-supplemented plain-text data from the service intersection data. Compared with a method of manually screening and exchanging the data from various datasets, this disclosure may automatically share the service data among different service nodes, so that the data exchange function of the same service data may be completed rapidly.

The blockchain data processing solution of this disclosure may be combined with the blockchain technology. The following describes the blockchain related technology involved in the blockchain data processing solution provided in this disclosure in detail with reference to FIG. 1 to FIG. 2.

I: Blockchain Data Processing System:

The data processing system involved in the embodiment of this disclosure may be a blockchain data processing system formed by connecting a plurality of nodes in a network communication form. The blockchain is an application mode of computer technologies such as distributive data storage, point-to-point transmission, consensus mechanism, encryption algorithms, and the like, which is mainly used for arranging the data in a time sequence, and encrypting the data into an account book so as to prevent the data from being altered and counterfeited; and at the same time, the blockchain may also be used for verifying, storing, and updating the data. The blockchain is essentially a decentralized database. Each node in the database stores a same blockchain. A blockchain network includes a consensus node. The consensus node is responsible for the consensus of the entire blockchain network.

FIG. 1 is a schematic structural diagram of a blockchain data processing system according to an embodiment of this disclosure. As shown in FIG. 1, the blockchain data processing system involved in the embodiment of this disclosure may include a witness network and a consensus network. The witness network may include a plurality of service nodes 101, and the consensus network may include a plurality of consensus nodes 102 (which may also be referred to as an account node). The number of the service nodes in the witness network and the number of the consensus nodes in the consensus network in the embodiment of this disclosure are merely used as an example, which are not specifically limited by the embodiments of this disclosure. Furthermore, the service nodes 101 and the consensus nodes 102 in the blockchain data processing system may be connected directly or indirectly in a wired way or a wireless way, which is not limited by this disclosure.

Each consensus node 102 in the consensus network may receive input information during normal operation. For example, any consensus node 102 may receive encrypted data transmitted by any service node 101. In another example, any consensus node 102 may receive service updating data of the encrypted data transmitted by any service node 101. Each consensus node 102 may maintain shared data in the consensus network based on the received input information. In order to ensure the information communication in the consensus network, each consensus node 102 in the consensus network may have information connection (such as direct or indirect connection in the wired way or the wireless way), and information may be transmitted between the nodes through the information connection. For example, in a case that any consensus node 102 in the consensus network receives the input information, other consensus nodes in the consensus network acquire the input information according to a consensus algorithm, and the input information is used as data among the shared data to be stored, so that the data stored on the consensus nodes in the consensus network in the blockchain data processing system is consistent.

The blockchain network may realize the information connection between the nodes based on a node identifier, and each node (a service node 101 and a consensus node 102) in the blockchain data processing system is provided with a corresponding node identifier; moreover, each node in the blockchain data processing system may store the node identifiers of other nodes in the blockchain data processing system, so that generated blocks are broadcast to other nodes in the blockchain data processing system according to the node identifiers of other nodes. Each node may maintain a node identifier list as shown in the following table, and node names and node identifiers are correspondingly stored into the node identifier list.

The node identifier may be an IP (Internet Protocol, which is a protocol for an interconnection between networks) address or any other type of information capable of identifying the node in the blockchain network. In table 0, only the IP address is taken as an example for description. For example, the node 1 (for example, the node 1 may be the service node 101 as shown in FIG. 1) may transmit information (such as a block) to the node 2 (for example, the node 2 may be the consensus node 102 as shown in FIG. 1) through the node identifier 000.000.000.000, and the node 2 may determine that the information is transmitted by the node 1 through the node identifier 111.111.111.111.

TABLE 0

| Node identifier list | |
|---|---|
| Node name | Node identifier |
| Node 1 | 000.000.000.000 |
| Node 2 | 111.111.111.111 |
| . . . | . . . |
| Node N | xx.xx.xx.xx |

The above-mentioned data processing solution is further illustrated below with reference to FIG. 1.

As shown in FIG. 1, the consensus nodes in the consensus network are mainly responsible for packaging a batch of transactions to generate blocks, execute transactions, and participate in the consensus of the blocks (achieve a consensus with other consensus nodes so as to update a state of the blockchain); The service nodes in the witness network are mainly used for executing service logics related to the service data (such as acquiring browsing data of an object A on a shopping platform; for another example, acquiring social interaction data of an object B on a social platform, etc.), and submitting service data to the consensus network, and synchronizing the block data from the consensus nodes. Specifically, the service nodes in the witness network may submit the service data to the consensus nodes in the consensus network, and the service data may be uplinked after the block consensus of each consensus node in the consensus network. Furthermore, the service nodes in the witness network may also acquire the uplinked service data from the consensus nodes in the consensus network. Moreover, the witness network and the consensus network are in different network environments. For example, the witness network is in a public network, and the consensus network is in a private network (such as a network where a government or a business organization is located).

The service nodes and the consensus nodes in the blockchain data processing system provided in the embodiment of this disclosure both may be implemented by one or more computer devices. The computer device includes, but is not limited to a terminal device or a server. The terminal device may include, but is not limited to: a mobile phone, a tablet computer, a notebook computer, a palmtop computer, a mobile Internet device (MID), an intelligent voice interaction device, a vehicle terminal, roadside equipment, an aircraft, a wearable device, a smart home appliance, or a wearable device with a network configuration and management function such as a smart watch, a smart bracelet, a pedometer, and the like. The server may be an independent physical server, or a server cluster or distributive system composed of a plurality of physical servers, or a cloud server providing cloud services, cloud databases, cloud computation, cloud functions, cloud storage, network services, cloud communication, middle-ware services, domain name services, security services, content delivery network (CDN), and basic cloud computing services such as big data, artificial intelligent platforms, and the like.

In some embodiments, the above-mentioned blockchain data processing solution is further illustrated in combination with the service node 101 and the consensus node 102 in FIG. 1. Specifically, the consensus node 102 may acquire service updating data of each encrypted data. The service updating data of the target encrypted data among the n groups of encrypted data is obtained after each service node with data updating permission performs data encryption on primary key information of the target encrypted data according to a respective secret key of the service node. The target encrypted data is any one of the n groups of encrypted data. The consensus node 102 may perform data intersection on the service updating data of the n groups of encrypted data according to the primary key information of each service updating data to obtain service intersection data. The consensus node 102 may transmit the service intersection data to a target service node (such as the service node 101) among the n service nodes, so that the target service node 101 parses the service intersection data to obtain to-be-supplemented plain-text data.

In some other embodiments, the target service node 101 may acquire the encrypted data of the n service nodes stored in the consensus node 102. The target service node 101 performs data encryption on the primary key information of the target encrypted data by using a secret key of a reference service node to generate the service updating data of the target encrypted data. The target service node 101 transmits the service updating data of the target encrypted data to the consensus node 102, so that the consensus node 102 determines the service intersection data based on the service updating data of the target encrypted data and the service updating data of other service nodes. Finally, the target service node 101 acquires the service intersection data from the consensus node 102, and determines the to-be-supplemented plain-text data based on the service intersection data.

A schematic diagram of a system architecture described in the embodiment of this disclosure is for more clearly describing the technical solutions in the embodiment of this disclosure, and does not constitute a limitation to the technical solution provided in the embodiments of this disclosure. Persons of ordinary skill should understand that, with evolution of a system architecture and appearance of a new service scenario, the technical solution provided in the embodiments of this disclosure also apply to a similar technical problem.

II: Blockchain Structure

Figure 2:
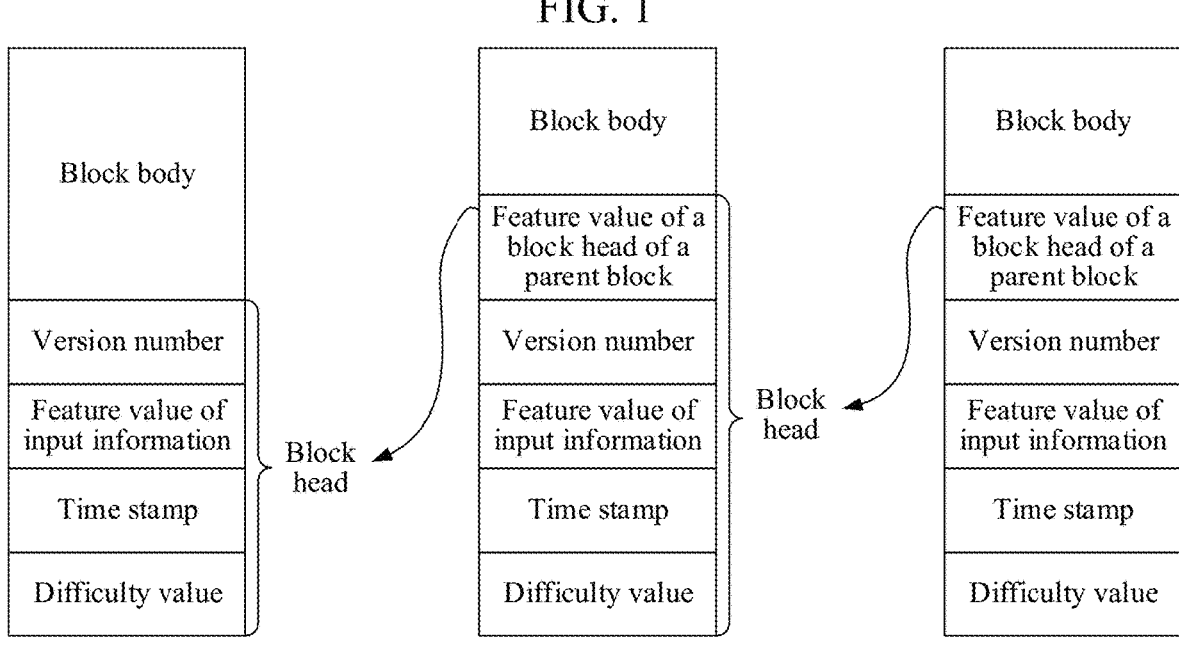
FIG. 2 is a schematic structural diagram of a blockchain according to an embodiment of this disclosure.

FIG. 2 is a schematic structural diagram of a blockchain according to an embodiment of this disclosure. As shown in FIG. 2, the blockchain includes a plurality of blocks (including an original block), the original block includes a block head and a block body, the block head stores an input information feature value, a version number, a time stamp, and a difficulty value, and the block body stores the input information; A next block of the original block takes the original block as a parent block, the next block also includes a block head and a block body, the block head stores the input information feature value (for example, the input information is the encrypted data, the service updating data, the service intersection data, etc.) of the current block, and the block head feature value, the version number, the time stamp, and the difficulty value of the parent block, so that the block data stored in each block in the blockchain is associated with the block data stored in the parent block, which ensures the security of the input information in the block.

The block is a data packet carrying transaction data on the blockchain network, which is a data structure marked with the time stamp and a hash value of the previous block. The block verifies and determines the transaction in the block through the consensus mechanism of the network. In the blockchain, prior to uplinking a block, the block needs consensus through the consensus node in the consensus network, and the block can only be added to the blockchain after the consensus is passed. In a case that the blockchain is applied to some scenarios of government or business organizations, not all participant nodes (i.e. the service nodes and the consensus nodes) in the blockchain have enough resources and necessity to become the consensus nodes of the blockchain.

III: Smart Transportation:

In some embodiments, the blockchain data processing solution may be applied to the field of smart transportation and smart driving. An intelligent traffic system (ITS) is also called intelligent transportation system, which is to effectively apply the advanced technologies (such as information technology, computer technology, data communication technology, sensor technology, electronic control technology, automatic control theory, operational research, artificial intelligence, etc.) to the traffic transportation, service control, and vehicle manufacture so as to enhance the connection among the vehicles, roads, and users, thereby forming a comprehensive transportation system capable of ensuring the security, improving the efficiency, improving the environment, and saving the energy.

Specifically, n service nodes may include first service nodes and second service nodes. The service node may be a traffic management platform A where city A is located, and the service node may be an automobile sales company B where the city A is located. The first service node may acquire traffic flow information of the city A, for example, which may include: traffic flow, morning peak period, evening peak period, vehicle details, etc. The second service node may acquire vehicle sales information of the city A, for example, which may include: vehicle brands, daily sales volume of the vehicles of each brand, target objects of the vehicles of each brand, etc. The first service node and the second service node may encrypt the respective acquired service data (the traffic flow information of the city A, and the vehicle sales information of the city A), and upload the encrypted data to the consensus nodes in the blockchain, and the consensus nodes perform the uplink storage of the encrypted data. Based on the blockchain data processing solution provided in this disclosure, the consensus node may acquire the service intersection data from the encrypted traffic flow information of the city A, and the encrypted vehicle sales information of the city A. For example, the service intersection data may include: vehicle brands with large traffic flow and small traffic flow in the city A during the early peak period and the evening peak period. The second service node may acquire the service intersection data, and then parses the service intersection data to obtain that a sales amount, publicity, and the like of which brand of vehicle need to be improved. In this way, different service nodes may safely and conveniently acquire the to-be-supplemented data that is difficulty to acquire, so that the publicity of the service brand, and the performance of the company are improved based on these acquired to-be-supplemented data.

Based on the above description of the blockchain data processing solution and the blockchain data processing system, an embodiment of this disclosure provides a blockchain data processing method. FIG. 3 is a flowchart of a blockchain data processing method according to an embodiment of this disclosure. The blockchain data processing method may be executed by a consensus node (such as a terminal device or a server) in the blockchain data processing system mentioned in FIG. 1. The blockchain data processing method may include the following steps S301-S303:

S301: Acquire service updating data of n groups of encrypted data, the service updating data being obtained by encrypting primary key information of the n groups of encrypted data.

For any encrypted data among the n groups of encrypted data, the primary key information of the encrypted data is encrypted by a secret key of a reference node to obtain the service updating data of the encrypted data. In other words, the service updating data of the target encrypted data in the n groups of encrypted data is obtained after the reference service node performs data encryption on the primary key information of the target encrypted data according to a secret key of the service node. The reference service node is a service node with data update permission for the target encrypted data among n service nodes except the target service node, and the target encrypted data is any one of n groups of encrypted data. The target encrypted data is obtained by encrypting the service data by the target service node. In other words, the target service node is a node generating the target encrypted data. In a case that the target encrypted data is any encrypted data, the target service node is any service node.

In the embodiment of this disclosure, a consensus node stores n groups of encrypted data generated by n service nodes. The n groups of encrypted data are obtained by encrypting the service data by the service nodes. In some embodiments, any group of encrypted data is obtained after the service node encrypts the service data through the secret key, that is, any group of encrypted data is determined by encrypting the service data constructed based on a key-value pair based on the secret key of the service node. The service nodes are in one-to-one correspondence to the encrypted data. The target encrypted data corresponds to the target service node, and the primary key information of the target encrypted data is generated by the target service node. n is a positive integer greater than 1. The secret key may include a private key and a public key, and the called private key refers to that a holder owns the secret key alone, and does not disclose the key to the public; and the public key refers to that the key may be acquired by any object, and is disclosed to the public. Unless otherwise specified, the secret key mentioned in the embodiment of this disclosure refers to the private key.

In some embodiments, at least two groups of encrypted data are generated by the same service node, that is, one service node may correspond to at least two groups of encrypted data. Or, the at least two groups of encrypted data are generated by different service nodes, and the service nodes are in one-to-one correspondence to the encrypted data.

The consensus node and the service node both may be nodes inside the blockchain network, or, the consensus node is the node inside the blockchain network, and the service node is the node outside the blockchain network, which is not specifically limited by the embodiments of this disclosure. It should be noted that, the consensus node and the service node are usually in different network environments, the consensus node usually refers to the node in the private network, and the service node usually refers to the node in the public network.

In some embodiments, the n groups of encrypted data stored in the consensus node may be data uploaded by each service node. The service node may upload the data to the consensus node by invoking a data uploading interface of a smart contract. Similarly, the way for the consensus node to acquire the service updating data for each encrypted data may be to acquire the data uploaded by each service node by invoking the data uploading interface of the smart contract.

Any service node may acquire the corresponding service data. In a case that the service node is a social platform, the service node may acquire a social interaction message generated between a plurality of objects on the social platform, for example, a dialog message of a plurality of group members in a group chat session may be used as the service data acquired by the service node. In a case that the service node is a shopping platform, the service node may acquire shopping details (such as a browsing record, a shopping record, etc.) corresponding to a plurality of objects on the shopping platform. For example, the commodity information (such as name, amount of money, commodity category, etc.) bought by each object on the shopping platform, and the object information (such as a nickname, an account number, etc.) may be used as the service data acquired by the service node.

Figure 4:
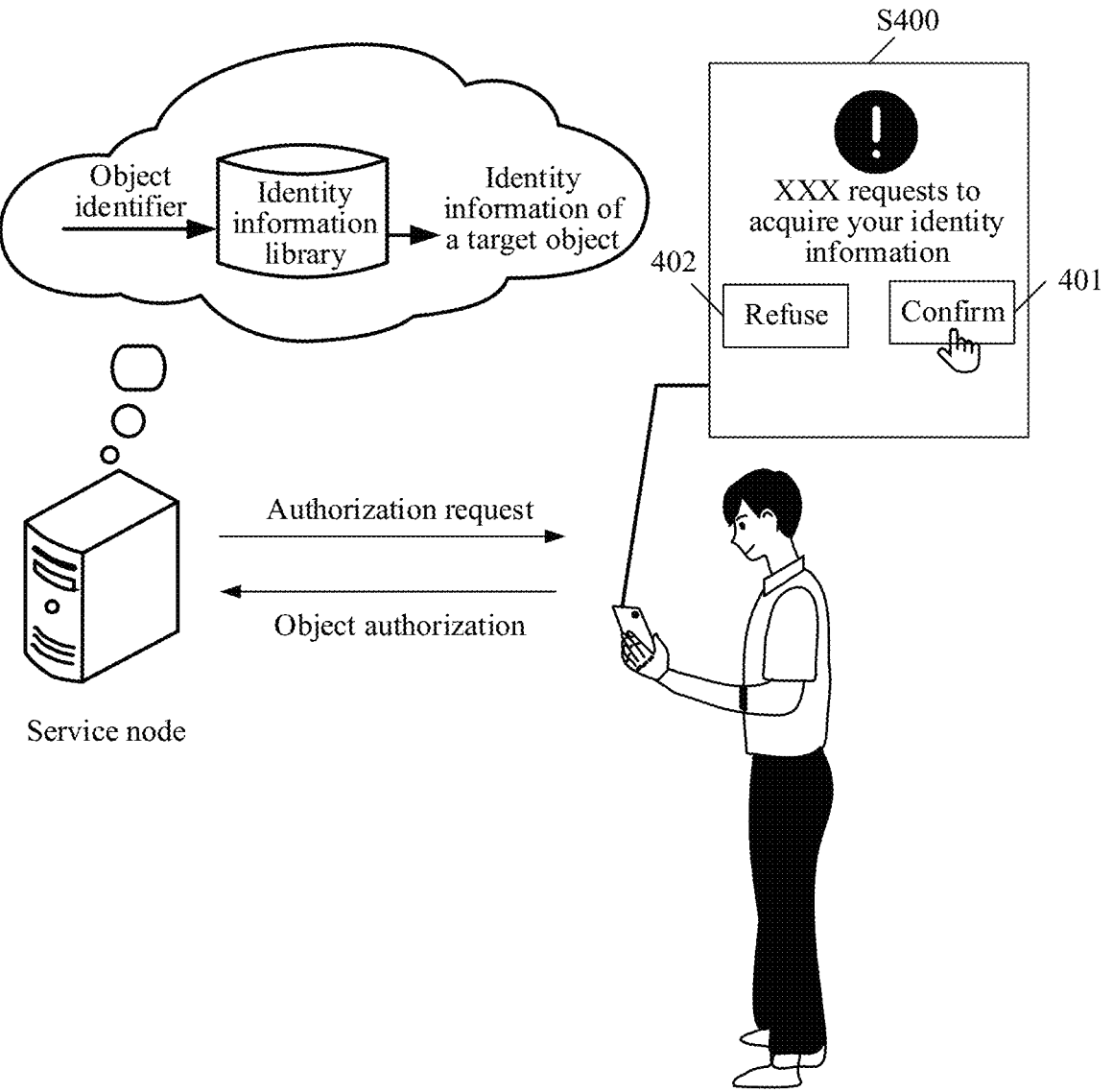
FIG. 4 is a schematic diagram of a scenario for acquiring service data according to an embodiment of this disclosure.

FIG. 4 is a schematic diagram of a scenario for acquiring service data according to an embodiment of this disclosure. As shown in FIG. 4, prior to acquiring the object information (service data) of the target object, the service node needs to transmit an authorization request to the target object. The authority request is used for requesting the authorization of the target object. After the target object agrees to the authorization, the object information of the target object may be acquired. For example, after acquiring the authorization request transmitted by the service node, the terminal device used by the target object may display an interface S400. The interface S400 displays prompt information of prompting whether the target object determines the authorization, and is provided with a confirmation control 401 and a refusing control 402. In a case that the target object clicks the confirmation control 401, it represents that the target object agrees the authorization, and in a case that the target object clicks the refusing control 402, it represents that the target object refuses the authorization. In this way, the security of the object information may be ensured.

In some embodiments, the target service nodes are in one-to-one correspondence to the target encrypted data, and the target service node is any one of the n service nodes. Prior to acquiring the service updating data for each group of encrypted data, the consensus node may also acquire a data authorization request for a smart contract authorization interface transmitted by the target service node. The data authorization request includes the node information of at least one reference service node. For example, the node information may include a node identifier. The reference service node includes the service node among the n service nodes except the target service node. The consensus node may respond to the data authorization request, and determine that each reference service node indicated by the node information of the data authorization request has the permission to update the target encrypted data. In the embodiment of this disclosure, the number of the reference service nodes may be one, or multiple. Specifically, the number of the reference service nodes may be n−1.

For example, assuming n=2, the target service node is the node 1, and the reference service node includes the node 2. The node 1 may transmit the data authorization request to the consensus node, and the data authorization request carries the node identifier of the node 2; and after responding to the data authorization request, the consensus node may determine that the node 2 has the permission to update the encrypted data of the node 1. Similarly, the node 2 may also transmit the data authorization request to the consensus node, and the data authorization request carries the node identifier of the node 1; and after responding to the data authorization request, the consensus node may determine that the node 1 has the permission to update the encrypted data of the node 2.

Furthermore, after determining that each reference service node has the permission to update the target encrypted data, the consensus node may transmit an authorization success notification message to each reference service node. The authorization success notification message is used for instructing each reference service node to update the encrypted data respectively so as to obtain the service updating data of each reference service node. In this way, each service node makes other service nodes have the permission to update the encrypted data uploaded by themselves by invoking a smart contract authorization interface. The security and reliability in data processing are ensured.

In some embodiments, the data authorization request carries the node identifier of the target service node. After acquiring the data authorization request, the consensus node may acquire the node identifier in the target service node. The target service node is verified based on the node identifier of the target service node, and the verification may include security verification and legality verification. In a case of passing the verification, the consensus node responds to the data authorization request; and in a case of failing the verification, the consensus node does not respond to the data authorization request. In this way, the target service node may be verified, which ensures the reliability and security during the data processing.

In some embodiments, the target encrypted data is stored in a data structure of a primary key-value, and the value information of the target encrypted data is generated according to the service data of the target service node. The primary key information of the target encrypted data is obtained by encrypting a curve point mapped by the target service node on an elliptic curve through a secret key of the target service node; and the curve point mapped by the target service node on the elliptic curve is generated based on an object address acquired by the target service node. For example, the object address of the target service node is expressed as addr, and the curve point mapped by the object address addr on the elliptic curve may be expressed as P(addr). The secret key of the target service node may be a random number k generated by a random algorithm, and then primary key information Enc(addr)=k*P(addr) of the target encrypted data may be obtained after encrypting P(addr) based on k.

The object address of any object is unique in the blockchain. The service data of the target service node may adopt the object address acquired by the target service node as a primary key. The service data that may be acquired by each service node is limited, for example, the first service node may acquire an attribute a and attribute c of the addr1 (object 1) and addr3(object 3); The second service node may acquire the attribute a and attribute b of the addr1 (object 1) and addr2 (object 2). The data structure of the service data may be as shown in table 1:

TABLE 1

| Data structure of the service data | | | |
|---|---|---|---|
| Object address | Attribute a | Attribute b | Attribute c |
| addr1 | XXX | XXX | XXX |
| addr2 | XXX | XXX | XXX |
| addr3 | XXX | XXX | XXX |

As shown in the above table 1, the data structure of the service data may be in a format of K (Key)-V(Value). Key may refer to the object address of the object; and Value may refer to the specific content of the service data. For example, in a case that key=addr1, value is the specific content respectively included by the attribute a, the attribute b, and the attribute c.

Further, in a case that each service node expects to acquire the common attribute of each service and complement the attribute of a common object, the service data may be encrypted based on the secret key of each service node to obtain the encrypted data of each service node, and each encrypted data is uplinked and stored. In this way, the privacy of the service data may be protected, and each service data may be prevented from being leaked.

In some embodiments, for any encrypted data, the service updating data corresponding to the encrypted data may be obtained by encrypting the primary key information of the encrypted data. Each encrypted data corresponds to a piece of service updating data. Correspondingly, a group of encrypted data corresponds to a group of service updating data, and n groups of encrypted data correspond to n groups of service updating data.

It should be noted that, in the subsequent embodiment of this disclosure, n service nodes including first service nodes and second service nodes are taken as an example to describe relevant steps involved in the embodiment of this disclosure in detail:

1) First Encrypted Data and Second Encrypted Data:

On the blockchain, the encrypted data (which may be called first encrypted data) of the first service node stores the data structure as shown in the following table 2.1 in the smart contract, where the object addresses (addr1, and addr3) are protected by the secret key k1 of the first service node.

TABLE 2.1

| First encrypted data | | |
|---|---|---|
| Object address | Attribute a | Attribute c |
| k1*P (addr1) | XXX | XXX |
| k1*P (addr3) | XXX | XXX |

Similarly, the encrypted data (which may be called second encrypted data) of the second service node stores the data structure as shown in the following table 2.2 in the smart contract, where the object addresses (addr1, and addr2) are protected by the secret key k2 of the second service node.

TABLE 2.2

| Second encrypted data | | |
|---|---|---|
| Object address | Attribute a | Attribute b |
| k2*P (addr1) | XXX | XXX |
| k2*P (addr2) | XXX | XXX |

As shown in the table 2.1 and the table 2.2, the primary key information of the encrypted data of the first service node refers to k1*P (addr1) and k1*P (addr3). The primary key information of the encrypted data of the second service node refers to k2*P (addr1) and k2*P (addr2).

In this way, the service data of each service node stored by the consensus node is obtained after encryption through the secret key of the corresponding service node, so that the security of each service data may be ensured.

2) First Service Updating Data, and Second Service Updating Data:

In the embodiment of this disclosure, the first service updating data may be obtained by updating the first encrypted data after the second service node invokes a data updating interface of the smart contract; and similarly, the second service updating data may be obtained by updating the second encrypted data after the first service node invokes the data updating interface of the smart contract.

In some embodiments, the first service node corresponds to the first encrypted data, and the second service node corresponds to the second encrypted data. The acquired service updating data includes the first service updating data and the second service updating data. The first service updating data is obtained by encrypting the first encrypted data, and the second service updating data is obtained by encrypting the second encrypted data.

The first service updating data is obtained after the second service node encrypts the first primary key information of the first encrypted data based on the private key of the second service node. The second service updating data is obtained after the first service node encrypts second initial service updating data based on a public key and secret key exchange algorithm of the second service node. The second initial service updating data is obtained after the first service node encrypts the first primary key information of the second encrypted data based on the private key of the first service node.

Or, the first service updating data is obtained after the second service node encrypts the first initial service updating data based on a public key and a secret key exchange algorithm of the first service node. The first initial service updating data is obtained after the second service node encrypts the second primary key information of the first encrypted data based on the private key of the second service node. The second service updating data of the second service node is obtained after the first service node encrypts the first primary key information of the second encrypted data based on the private key of the first service node.

The secret key exchange algorithm may be a diffie-hellman (DH) secret key exchange algorithm. The algorithm may allow both parties of communication to create a secret key through an insecure channel without any advance information of the other party. A principle of the DH secret key exchange algorithm is as follows: The first service node A has the private key x, and the public key $g^x$; and the second service node B has the private key y, and the public key $g^y$. In a case that A and B exchange the public key, the new secret key of A is $(g^y)^x = g^{(yx)}$; and the new secret key of B is $(g^x)^y = g^{(xy)}$. In this way, A and B negotiate the new secret key $g^{(xy)}$. The new secret key is determined based on the secret keys of A and B.

The secret key of the first service node may be expressed as k1, and the secret key of the second service node may be expressed as k2. The primary key information of the first service updating data determined based on the DH secret key exchange algorithm is the same as the primary key information of the second service updating data. For example, the primary key information of the above two pieces of service updating data may be: k2*k1*P (addr); or, the primary key information may be: k1*k2*P (addr). In this way, the service updating data of each encrypted data is determined by encryption based on each service node with the data updating permission, which ensures the reliability of the data. Moreover, each service updating data is obtained by collective encryption based on the secret key of other service nodes and the secret key of the service node, which may ensure that the encryption secret key of each service updating data is the same.

In some embodiments, the service updating data of any encrypted data includes the primary key information and value information. The primary key information of the service updating data is obtained by encrypting the primary key information of the encrypted data, and the value information is kept consistent with the value information of the encrypted data. In some embodiments, the service updating data includes an association relationship between the primary key information and the encrypted data. That is, the value information of the service updating data is the association relationship with the encrypted data.

S302: Perform data intersection on the service updating data to obtain service intersection data.

Since each encrypted data is obtained after the encryption based on the secret key of each service node, and each service updating data is obtained after re-encryption based on the secret key of another service node, each service updating data is actually obtained by the collective encryption based on the secret keys of all service nodes (the service node and other service nodes), so that the encryption secret key of each service updating data may be ensured to be the same. That is, the primary key information of each service updating data is determined collectively by the secret key of each service node.

The embodiment of this disclosure takes the encrypted second primary key information of each data being equal to k1*k2*P (addr) as an example for illustration: According to the secret key exchange algorithm, after the encrypted data of the first service node is updated, the data structure of the obtained first service updating data is as shown in table 3.1:

TABLE 3.1

| First service updating data | | |
| --- | --- | --- |
| Object address | Attribute a | Attribute c |
| k1*k2*P (addr1) | XXX | XXX |
| k1*k2*P (addr3) | XXX | XXX |

Similarly, after the encrypted data of the second service node is updated, the data structure of the obtained second service updating data is as shown in table 3.2:

TABLE 3.2

| Second service updating data | | |
| --- | --- | --- |
| Object address | Attribute a | Attribute b |
| k1*k2*P (addr1) | XXX | XXX |
| k1*k2*P (addr2) | XXX | XXX |

As shown in the above table 3.1 and table 3.2, the primary key information of the first service updating data refers to: k1*k2*P (addr1), and k1*k2*P (addr3). The primary key information of the second service updating data refers to: k1*k2*P (addr1), and k1*k2*P (addr2).

Or, according to the secret key exchange algorithm, the encrypted data of the first service node is updated, the data structure of the obtained first service updating data is as shown in table 3.3:

TABLE 3.3

| First service updating data | | |
| --- | --- | --- |
| Object address | Attribute a | Attribute c |
| k2*k1*P (addr1) | XXX | XXX |
| k2*k1*P (addr3) | XXX | XXX |

Similarly, after the encrypted data of the second service node is updated, the data structure of the obtained second service updating data is as shown in table 3.4:

TABLE 3.4

| Second service updating data | | |
| --- | --- | --- |
| Object address | Attribute a | Attribute b |
| k2*k1*P (addr1) | XXX | XXX |
| k2*k1*P (addr2) | XXX | XXX |

As shown in the above table 3.3 and table 3.4, the primary key information of the first service updating data refers to: k2*k1*P (addr1), and k2*k1*P (addr3). The primary key information of the second service updating data refers to: k2*k1*P (addr1), and k2*k1*P (addr2).

In some embodiments, the consensus node performs data intersection on the service updating data to obtain service intersection data, which includes: the service updating data with the same primary key information is acquired from the service updating data of the n groups of encrypted data; and the acquired service updating data with the same primary key information is determined as the service intersection data. Specifically, the consensus node may acquire the same primary key information from the first service updating data and the second service updating data as follows: k1*k2*P (addr1). The service updating data with the primary key information of k1*k2*P (addr1) is combined into the service intersection data. The data structure of the service intersection data is as shown in table 4:

TABLE 4

| Service intersection data | | | |
| --- | --- | --- | --- |
| Object address | Attribute a | Attribute b | Attribute c |
| k1*k2*P (addr1) | XXX | XXX | XXX |

The consensus node may invoke a data intersection obtaining interface of the smart contract, and performs data intersection on the service updating data of the n groups of encrypted data according to the encrypted primary key information of each data, i.e. the primary key information of each service updating data so as to obtain the service intersection data as shown in the above table 4. Thus, it may be seen that since the first service node may acquire the attribute a and the attribute c of addr1 and addr3, the second service node may acquire the attribute a and the attribute b of the addr1 and addr2. One addr corresponds to the same service, so that for the first service node and the second service node, in a data sharing process, the method provided by the embodiment of this disclosure can enable the first service node to share the attribute a and the attribute c of addr1 and the second service node to share the attribute a and the attribute b of addr1, and in this way, the two parties share the service data of the same service (addr1) in the data sharing process, and may not expose or leak other service data (such as the attribute a and attribute c of addr3 in the first service node, and the attribute a and attribute b of addr2 in the second service node) in each dataset, thereby ensuring the privacy and reliability of the data.

In some embodiments, any service node may also transmit the primary key information of the service updating data to the consensus node, the consensus node screens the service updating data with the same primary key information as the primary key information from the service updating data of the n groups of encrypted data, and transmits the screened service updating data to the service node, and then the service node parses the received service updating data to obtain the to-be-supplemented plain-text data.

The essence of the service node updating the encrypted data is that each service node re-encrypts the primary key information in the encrypted data so as to change the primary key information from the first primary key information to the second primary key information, where the first primary key information is the primary key information generated by using the secret key of each service node, and the second primary key information is the primary key information generated by using the secret keys of all service nodes. In this way, the first service node and the second service node may update the respective encrypted data based on the secret key exchange algorithm to obtain the service updating data, thereby ensuring that the primary key information of each service updating data stored on the chain (the consensus node) is the same, and facilitating the data intersection based on the same primary key information so as to determine the service intersection data.

S303: Transmit the service intersection data to the service node to cause the service node to parse the service intersection data to obtain the to-be-supplemented plain-text data.

The to-be-supplemented plain-text data is data that the service node lacks. The consensus node may transmit the service intersection data respectively to the first service node and the second service node, and then the first service node and the second service node may parse the service intersection data to obtain the corresponding to-be-supplemented plain-text data.

For example, for the first service node, the service intersection data may be parsed to obtain the to-be-supplemented attribute b of addr1; and for the second service node, the service intersection data may be parsed to obtain the to-be-supplemented attribute c of addr1. In this process, except for the first service node and the second service node, no other service node acquires a plain-text of the service intersection data. Furthermore, for the first service node and the second service node, only the plain-text of the intersected data of the two parties is obtained respectively, and the data outside the intersection cannot be decrypted by the first service node and the second service node either.

In the embodiment of this disclosure, in a case that the n service nodes need to share the service data, the service data may be encrypted based on the secret key of the service node to generate the encrypted data, where n is a positive integer greater than 1, that is, the consensus node stores n groups of encrypted data generated by the n service nodes. The consensus node may acquire the service updating data for each encrypted data, where the service updating data of the target encrypted data in the n groups of encrypted data includes: the service updating data obtained by encrypting the primary key information of the target encrypted data by the reference service node according to the respective secret key, where the reference service node is a service node with the data updating permission for the target encrypted data except the target service node among the n service nodes, the target encrypted data is any one of the n groups of encrypted data, the target encrypted data corresponds to the target service node, and the primary key information of the target encrypted data is generated by the target service node. The consensus node may perform data intersection on the service updating data of the n groups of encrypted data according to the primary key information of each service updating data to obtain the service intersection data. Finally, the consensus node may transmit the service intersection data to the target service node among the n service nodes, so that the target service node parses the service intersection data to obtain the corresponding to-be-supplemented plain-text data. Thus, it may be seen that in this disclosure, by encrypting the service data by each service node, setting the data updating permission for the service node, and re-encrypting the first primary key information of any encrypted data, intersection performed on the service data of different service nodes on the blockchain may be ensured, so that each service node may share the to-be-supplemented plain-text data from the service intersection data. Compared with the manual data exchange, this disclosure may automatically realize the data sharing, so that the data processing efficiency is improved; and moreover, the entire data sharing process is performed on the blockchain, which may ensure the privacy of the data.

FIG. 5 is a flowchart of another blockchain data processing method according to an embodiment of this disclosure. As shown in FIG. 5, the blockchain data processing method may be executed by the target service node (such as any one of the n service nodes) in the blockchain data processing system mentioned in FIG. 1. The blockchain data processing method may include the following steps S501-S504:

S501: Acquire encrypted data of the n service nodes stored in a consensus node.

In some embodiments, the consensus node stores n groups of encrypted data generated by the n service nodes. Any group of encrypted data is obtained by encrypting the service data by the service node through a secret key, that is, any group of encrypted data is determined by encrypting the service data based on the secret key of the service node. The service nodes are in one-to-one correspondence to the encrypted data, and n is a positive integer greater than 1. Any service node among the n service nodes is expressed as a target service node, each service node stores the encrypted data generated based on the respective secret key into the consensus node, the target service node generates the target encrypted data, and n is a positive integer greater than 1.

It should be noted that, the embodiment of this disclosure takes the n service nodes including the target service node and the reference service node as an example for detail description; and the target service node in the embodiment of this disclosure may be the first service node mentioned in the above embodiment, and the reference service node may be the second service node mentioned in the above embodiment.

In some embodiments, the target encrypted data is stored in a data structure of a primary key (k)-value (v). The process of how to generate the target encrypted data is illustrated below:

1) An object address acquired by the target service node is mapped to a target curve point on an elliptic curve.

Specifically, assuming that an object address is expressed as addr, one object address may be used for only identifying one object, so that the target curve point obtained by mapping the target service node on the elliptic curve may be expressed as P(addr). The conventional elliptic curve includes Secp256k1, curve25519, etc. On the elliptic curve, it is relatively easy to obtain a product G*v of a point G and a scalar v, while it is difficult to obtain the scalar v through the point G and the product G*v, or obtain the point G through the scalar v and the product G*v, and the difficulty is equivalent to a discrete logarithm problem. Therefore, the target encrypted data encrypted in this way is difficult to decrypt easily by other service nodes, so that the security of the target encrypted data is ensured.

2) The secret key of the target service node is acquired, and the target curve point is encrypted based on the secret key of the target service node to obtain the primary key information of the target service node.

The secret key k of the target service node may be generated by a random algorithm. For example, the target service node may be a random number generated by the random algorithm, and the random number is used as the secret key k of the target service node. Then k may be used as the secret key to encrypt the object address to obtain the primary key information: $Enc(addr)=k*P(addr)$. For example, the secret key of the target service node may be k1, and the secret key of the reference service node may be k2.

3) The target encrypted data is generated based on the primary key information and the service data of the target service node.

The target encrypted data may include a plurality of pieces of primary key information, one piece of primary key information corresponds to one object address, and the secret key of the primary key information of the same service node is the same. For example, the data structure of the target encrypted data may be expressed as shown in the above table 2.1 or table 2.2.

It should be noted that, after generating the target encrypted data, the target service node may transmit the target encrypted data to the consensus node for storage by invoking a data uploading interface of a smart contract. After acquiring the target encrypted data, the consensus node may transmit the target encrypted data to various other consensus nodes in the consensus network, so that each consensus node performs consensus on the target encrypted data, and in a case of passing the consensus, the target encrypted data may be stored on the chain.

S502: Perform data encryption on the primary key information of the encrypted data of any reference service node to generate service updating data of the reference service node.

In some embodiments, before the target service node encrypts the primary key information of the encrypted data of the reference service node to generate the service updating data of the encrypted data of the reference service node, the method further includes: a data authorization request for a smart contract authorization interface is transmitted to the consensus node, where the data authorization request includes node information of at least one reference service node, and the reference service node includes the service node other than the target service node among the n service nodes. The data authorization request is used for triggering the consensus node to determine each reference service node indicated by the node information of the data authorization request, that is, at least one reference service node has the permission to update the corresponding encrypted data of the target service node.

In some embodiments, the target service node encrypts the primary key information of the encrypted data of the reference service node to generate the service updating data of the encrypted data of the reference service node, which may include: the primary key information of the encrypted data of the reference service node is encrypted by the secret key of the target service node to obtain the service updating data corresponding to the encrypted data of the reference service node. Or, the primary key information of the encrypted data of the reference service node is encrypted by the secret key of the target service node to obtain the reference updating data; and based on the public key and the secret key exchange algorithm of the reference service node, the reference updating data is encrypted to generate the service updating data corresponding to the encrypted data of the reference service node.

For example, assuming that the target service node is expressed as node 1, the reference service node is expressed as node 2. The primary key information of the encrypted data of the reference service node may be expressed as: $Enc(addr1)=k2*P(addr1)$. The node 1 may encrypt the primary key information $k2*P(addr1)$ of the encrypted data of the reference service node based on the secret key k1 of the node 1 to obtain the service updating data $k1*k2*P(addr1)$ corresponding to the encrypted data of the reference service node. Or, based on the public key and the secret key exchange algorithm (such as the DH secret key exchange algorithm) of the reference service node, $k1*k2*P(addr1)$ is encrypted to generate the service updating data $k2*k1*P(addr1)$ corresponding to the encrypted data of the reference service node.

S503: Transmit the service updating data of the encrypted data of the reference service node to the consensus node, and determine, by the consensus node, the service intersection data based on the service updating data of the reference service node and the service updating data transmitted by other service nodes to the consensus node.

Similarly, the service updating data of the target encrypted data includes: data determined after the reference service node encrypts the primary key information of the target encrypted data according to the secret key of the reference service node. Or, the reference service node encrypts the primary key information of the target encrypted data according to the secret key of the reference service node to obtain target initial service updating data; and the reference service node encrypts the target initial service updating data based on the public key and the secret key exchange algorithm of the target service node to generate the service updating data of the target encrypted data.

The service updating data of the target encrypted data is data determined after the reference service node encrypts the primary key information of the target encrypted data according to the secret key of each service node. The reference service node is a node with data updating permission for the target encrypted data among the n service nodes, and the target encrypted data is any one of the n groups of encrypted data.

In this way, each service node may update the encrypted data of other service nodes to obtain the service updating data of the encrypted data of other nodes, and finally the service updating data generated by each service node may be uploaded to the consensus node, so that the consensus node determines the service intersection data based on each service updating data.

For example, in a case that the primary key information of the target encrypted data may be expressed as Enc(addr1) =k1*P(addr1); the primary key information obtained after data encryption is performed on Enc(addr1)=k1*P(addr1) based on the secret key k2 of the reference service node (node 2) is expressed as: k1*k2*P(addr1). Or, in a case that the primary key information of the target encrypted data may be expressed as Enc(addr1)=k2*P(addr1); the primary key information obtained after data encryption is performed on Enc(addr1)=k1*P(addr1) based on the secret key k1 of the reference service node (node 1) is expressed as: k2*k1*P (addr1).

In this way, each service node may encrypt the respective encrypted data based on the secret keys of other service nodes to obtain the service updating data of each encrypted data. Each service node may invoke the data uploading interface of the smart contract respectively to transmit the service updating data of the encrypted data to the consensus node.

S504: Acquire the service intersection data from the consensus node, and determine to-be-supplemented plain-text data based on the service intersection data.

The to-be-supplemented plain-text data is data that the target service node lacks.

The service intersection data obtained after intersection is performed on the encrypted data on the blockchain is applied to the following application scenarios:

1) A plurality of service nodes complete the attribute information of a common object without exposing any data in the dataset. Specifically, the first service node may provide the attribute a and attribute b of the object 1; and the second service node may provide the attribute a and attribute c of the object 1. In this disclosure, the first service node and the second service node may perform data intersection, so that both parties may acquire the attribute a, the attribute b, and the attribute c of the object 1.

2) A plurality of service nodes acquire the overlapped object information in the dataset without exposing any data in the dataset. Specifically, the first service node may provide the attribute a and attribute b of the object 1; and the second service node may provide the attribute a and attribute c of the object 1. In this disclosure, the first service node and the second service node may perform data intersection, so that both parties may determine the overlapped object information as the attribute a of the object 1.

In some embodiments, the target service node may transmit a data acquisition request to the consensus node, and the data acquisition request carries a node identifier of the target service node. However, the consensus node may verify the target service node according to the node identifier of the target service node in the data acquisition request, and the verification may include security verification and legality verification. In a case of passing the verification, the consensus node responds to the data acquisition request and transmits the service intersection data to the target service node; In a case of failing the verification, the consensus node does not respond to the data acquisition request. In this way, the target service node may be verified, which ensures the reliability and security during the data processing.

In some embodiments, the target service node determines the to-be-supplemented plain-text data based on the service intersection data, which may include the following process:

Firstly, the service intersection data is parsed based on the private key of the target service node to obtain target parsed intersection data, and the target parsed intersection data is transmitted to the consensus node.

For example, the service intersection data may be as shown in the above table 4. Then the target service node may invoke a data parsing interface of the smart contract, and parses the service intersection data based on the private key k1 of the target service node to obtain the target parsed intersection data. The target parsing intersection data is as shown in table 5.1:

TABLE 5.1

| Target parsed intersection data | | | |
|---|---|---|---|
| Object address | Attribute a | Attribute b | Attribute c |
| k2*P (addr1) | XXX | XXX | XXX |

The target parsed intersection data is cipher-text data obtained by the encryption with the secret key (k2) of the reference service node. The target service node may invoke the data uploading interface of the smart contract to transmit the target parsed intersection data to the consensus node.

The reference parsed intersection data transmitted by the consensus node is received, and the reference parsed intersection data is obtained by parsing the service intersection data based on the private key of the reference service node.

Similarly, for the reference service node, the reference service node may invoke a data parsing interface of the smart contract, and parse the service intersection data based on the private key k2 of the reference service node to obtain the reference parsed intersection data. The reference parsed intersection data is as shown in table 5.2:

TABLE 5.2

| Reference parsed intersection data | | | |
|---|---|---|---|
| Object address | Attribute a | Attribute b | Attribute c |
| k1*P (addr1) | XXX | XXX | XXX |

The reference parsed intersection data is cipher-text data obtained by encryption with the secret key (k1) of the target service node. The target service node may invoke the data uploading interface of the smart contract to transmit the reference parsed intersection data to the consensus node.

Finally, the reference parsed intersection data is decrypted according to the private key of the target service node to obtain the to-be-supplemented plain-text data corresponding to the target service node.

Specifically, after the target service node utilizes the private key k1 to decrypt the reference parsed intersection data as shown in the above table 5.2, the service intersection plain-text data as shown in the following table 6 may be obtained:

TABLE 6

| Service intersection plain-text data | | | |
| --- | --- | --- | --- |
| Object address | Attribute a | Attribute b | Attribute c |
| P (addr1) | XXX | XXX | XXX |

As shown in the above table 6, the target service node may determine the to-be-supplemented plain-text data corresponding to the target service node according to the service intersection plain-text data as: attribute b of addr1. Thus, it may be seen that the service data that may be acquired by the target service node (the first service node) includes: attribute a and attribute c of addr1, after the data intersection is performed on the blockchain, the first service node may also acquire the attribute b of addr1, so that the service data may be enriched; and moreover, the entire process is executed after the encryption on the blockchain, and the security of the data is also ensured.

Similarly, for the reference service node, the process is the same. After the target parsed intersection data as shown in the above table 5.1 may also be decrypted by the secret key k2, the service intersection plain-text data as shown in the above table 6 may also be obtained. Therefore, according to the service intersection plain-text data, the to-be-supplemented plain-text data corresponding to the reference service node may be determined as: attribute c of addr1.

In the above process, except for the target service node (the first service node) and the reference service node (the second service node), no other service node acquires the plain-text data of the service intersection data. Furthermore, for the target service node (the first service node) and the reference service node (the second service node), only the plain-text data of the service intersection data is obtained respectively, and the data outside the intersection cannot be decrypted by the first service node and the second service node either. Therefore, in the embodiment of this disclosure, the process of determining the service intersection data is performed on the blockchain, which ensures the reliability of the service intersection data; and moreover, not all service nodes may decrypt the service intersection data, thereby ensuring the security of the service intersection data.

In some embodiments, an embodiment of this disclosure further provides a blockchain data processing method, which is executed by a blockchain data processing system. The blockchain data processing system includes a consensus node and n service nodes, where n is a positive integer greater than 1;

The method includes the following steps (1)-(4).

(1) n service nodes acquire n groups of encrypted data from the consensus node, and the n groups of encrypted data is obtained by encrypting the service data by the n service nodes;

(2) The n service nodes transmit the service updating data of the n groups of encrypted data to the consensus node, and the service updating data is obtained by encrypting primary key information of the n groups of encrypted data;

(3) The consensus node performs data intersection on the service updating data to obtain service intersection data;

(4) The n service nodes acquire the service intersection data from the consensus node, and determine to-be-supplemented plain-text data based on the service intersection data, and the to-be-supplemented plain-text data is data that the n service nodes lack.

Figure 6:
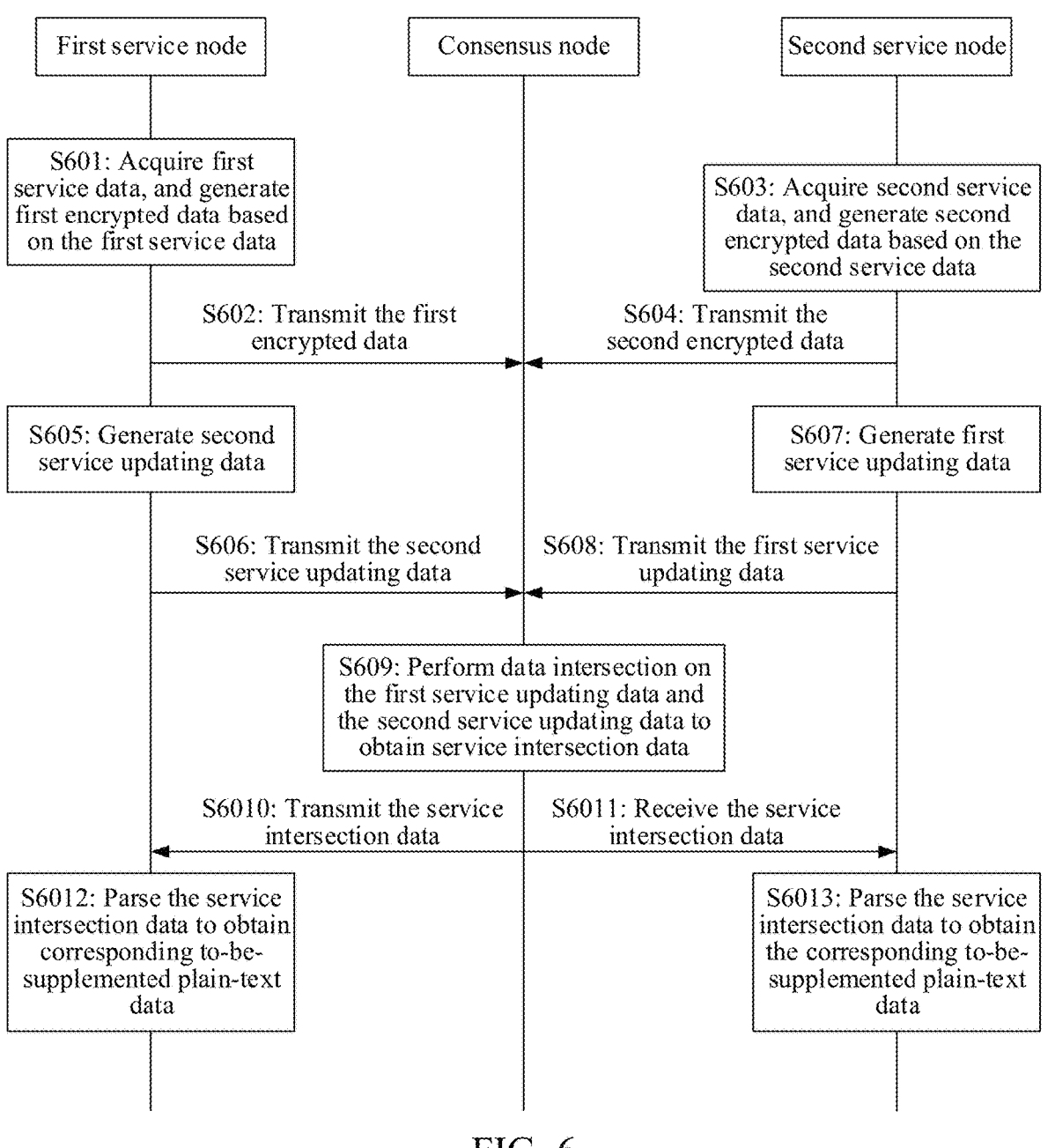
FIG. 6 is a flowchart of interaction of a blockchain data processing method according to an embodiment of this disclosure.

In combination with a specific service scenario, the n service nodes including first service nodes and second service nodes are taking as an example to describe the blockchain data processing solution provided in the embodiment of this disclosure again in detail below. FIG. 6 is a flowchart of interaction of a blockchain data processing method according to an embodiment of this disclosure. As shown in FIG. 6, the blockchain data processing method may be executed collectively by the first service node, the second service node, and the consensus node. The blockchain data processing method may include the following steps S601-S6013:

S601: A first service node acquires first service data, and generates first encrypted data based on the first service data.

In the embodiment of this disclosure, in a case that the first service node is a social platform, the first service node may acquire a social interaction message generated between a plurality of objects on the social platform, for example, a dialog message of a plurality of group members in a group chat session may be used as the first service data acquired by the first service node. The first service data may include all dialog messages generated in a period from the creation of a group chat session to the acquisition time The first service data may also include the dialog message included in a certain fixed period of time (such as from January 1 to January 31), which is not specifically limited by the embodiment of this disclosure.

In some embodiments, the first server node generates the first encrypted data based on the first service data, which may include the following steps (1)-(3).

(1) An object address of the first service node is mapped to a target curve point on an elliptic curve.

Specifically, it is assumed that the object address acquired by the first service node is addr1. One object address may be used for only identifying one object, for example, addr1 may be used for identifying the object 1. The target curve point obtained by mapping the first service node on the elliptic curve may be expressed as: P (addr1).

(2) A secret key of the first service node is acquired, and the target curve point is encrypted based on the secret key of the first service node to obtain the primary key information.

The secret key k1 of the first service node may be generated by a random algorithm. For example, the first service node may be a random number generated by the random algorithm, and the random number is used as the secret key k1 of the target service node. Then k1 may be used as the secret key to encrypt the object address to obtain the primary key information: $Enc(addr1)=k1*P(addr1)$.

(3) The first encrypted data is generated based on the primary key information and the first service data.

For example, the first encrypted data may be in a K-V data format. For example, the data structure of the first encrypted data may be as shown in the above table 2.1, which is not repeated in the embodiment of this disclosure.

S602: The first service node transmits the first encrypted data to the consensus node.

Specifically, the first service node may invoke the data uploading interface of the smart contract to transmit the first encrypted data to the consensus node.

S603: The second service node acquires second service data, and generates second encrypted data based on the second service data.

In the embodiment of this disclosure, in a case that the second service node is a shopping platform, the second service node may acquire shopping details (such as a browsing record, a shopping record, etc.) corresponding to a plurality of objects on the shopping platform. For example, commodity information (such as name, amount of money, commodity category, etc.) purchased by each object on the shopping platform, the browsing record, etc. may be used as the second service data acquired by the second service node. The second service data may include all purchase records generated on the shopping platform within a period of time (such as from January 1 to January 31). The second service data may also include all purchase records generated in a certain store, which is not specifically limited by the embodiment of this disclosure.

It should be noted that, for details of a performing process in which "the second service node generates the second encrypted data based on the second service data", refer to the performing process shown in step S601 in which "the first service node generates the first encrypted data based on the first service data", which is not repeated here in the embodiment of this disclosure.

S604: The second service node transmits the second encrypted data to the consensus node.

It should be noted that, step S601 and step S603 may be performed in series, or in parallel; and similarly, step S602 and step S604 may be performed in series, or in parallel. That is, the steps S601-S604 do not constitute a limitation to a specific execution sequence of each step.

S605: The first service node generated second service updating data.

In some embodiments, before the first service node generates the first service updating data, the first service node transmits a data authorization request for a smart contract authorization interface to the consensus node, and the data authorization request is used for triggering the consensus node to determine that the second service node has the permission to update the first encrypted data.

The second service updating data is obtained after the first service node encrypts the primary key information of the second encrypted data based on the private key of the first service node. For example, the private key of the first service node is expressed as k1, and the primary key information of the second encrypted data is expressed as k2*P(addr1), so that the primary key information of the second service updating data may be expressed as: k1*k2*P (addr1).

Or, the second service updating data is obtained by encrypting second initial service updating data based on the public key and the secret key exchange algorithm of the second service node. The second initial service updating data is obtained after the first service node encrypts the primary key information of the second encrypted data based on the private key of the first service node. For example, the private key of the first service node is expressed as k1, and the primary key information of the second encrypted data is expressed as k2*P (addr1), so that the primary key information of the second service updating data may be expressed as: k2*k1*P (addr1).

S606: The first service node transmits second service updating data to the consensus node.

The first service node may transmit the second service updating data to the consensus node by invoking a data uploading interface of a smart contract.

S607: The second service node generates the first service updating data.

In some embodiments, before the second service node generates the first service updating data, the second service node transmits a data authorization request for the smart contract authorization interface to the consensus node, and the data authorization request is used for triggering the consensus node to determine that the first service node has the permission to update the second encrypted data.

The first service updating data is obtained after the second service node encrypts the primary key information of the first encrypted data based on the private key of the second service node. For example, the private key of the second service node is expressed as k2, and the primary key information of the first encrypted data is expressed as k1*P(addr1), so that the primary key information of the first service updating data may be expressed as: k2*k1*P (addr1).

Or, the first service updating data is obtained by encrypting the first initial service updating data based on the public key and the secret key exchange algorithm of the first service node. The first initial service updating data is obtained after the second service node encrypts the primary key information of the first encrypted data based on the private key of the second service node. For example, the private key of the first service node is expressed as k1, and the primary key information of the second encrypted data is expressed as k2*P(addr1), so that the primary key information of the first service updating data may be expressed as: k1*k2*P (addr1).

S608: The second service node transmits first service updating data to the consensus node.

The second service node may transmit the first service updating data to the consensus node by invoking the data uploading interface of the smart contract.

It should be noted that, step S605 and step S607 may be performed in series, or in parallel; and similarly, step S606 and step S608 may be performed in series, or in parallel. That is, the steps S605-S608 do not constitute a limitation to a specific execution sequence of each step.

The second service node may transmit the first service updating data to the consensus node by invoking the data uploading interface of the smart contract.

S609: The consensus node performs data intersection on the first service updating data and the second service updating data to obtain the service intersection data.

Specifically, the consensus node may acquire the service updating data with the same primary key information from the first service updating data and the second service updating data, and combine the service updating data into the service intersection data. For example, the same primary key information acquired from the first service updating data and the second service updating data may be expressed as: k1*k2*P (addr1).

S6010: The consensus node transmits the service intersection data to the first service node.

S6011: The consensus node transmits the service intersection data to the second service node.

After receiving a data acquisition request transmitted by the first service node or the second service node, the consensus node may respond to the data acquisition request, and transmit the service intersection data to the first service node, or the second service node.

S6012: The first service node parses the service intersection data to obtain corresponding to-be-supplemented plain-text data.

During implementation, the first service node may parse the service intersection data to obtain second parsed intersection data, where the second parsed intersection data is cipher-text data obtained by encryption with the secret key k2 of the second service node.

Further, the first service node may invoke the data uploading interface of the smart contract to transmit the second parsed intersection data to the consensus node. Subsequently, the second parsed intersection data may be used for parsing the second service node to obtain the service intersection plain-text data.

The first service node may acquire the first parsed intersection data from the consensus node, where the first parsed intersection data is cipher-text data obtained after the encryption with the secret key k1 of the first service node. The first service node may parse the first parsed intersection data to obtain the service intersection plain-text data. Finally, the to-be-supplemented plain-text data corresponding to the first service node is acquired based on the service intersection plain-text data.

S6013: The second service node parses the service intersection data to obtain the corresponding to-be-supplemented plain-text data.

Similarly, the second service node may acquire the second parsed intersection data from the consensus node, where the second parsed intersection data is cipher-text data obtained after the encryption with the secret key k2 of the second service node. The second service node may parse the second parsed intersection data to obtain the service intersection plain-text data. Finally, the to-be-supplemented plain-text data corresponding to the second service node is acquired based on the service intersection plain-text data.

In the embodiment of this disclosure, except for the first service node and the second service node, no other service node acquires the plain-text data of the service intersection data. Furthermore, for the first service node and the second service node, only the plain-text data of the service intersection data is obtained respectively, and the data outside the intersection cannot be decrypted by the first service node and the second service node either. Furthermore, the process of determining the service intersection data is performed on the blockchain, which ensures the reliability of the service intersection data; and moreover, not all service nodes may decrypt the service intersection data, thereby ensuring the security of the service intersection data.

Figure 7:
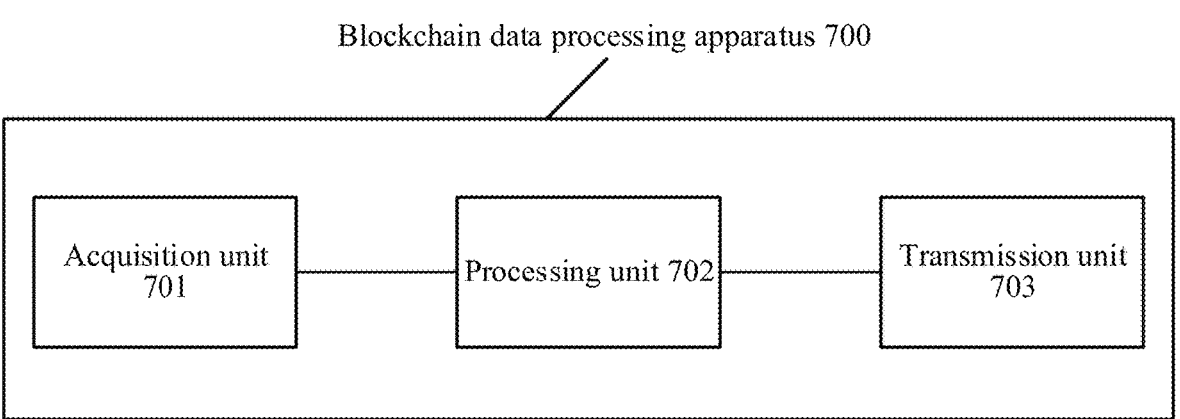
FIG. 7 is a schematic structural diagram of a blockchain data processing apparatus according to an embodiment of this disclosure.

FIG. 7 is a schematic structural diagram of a blockchain data processing apparatus according to an embodiment of this disclosure. The blockchain data processing apparatus 700 may be applied to a consensus node in the aforementioned embodiments. The blockchain data processing apparatus 700 may be a computer program (including a program code) run in a computer device, for example, the blockchain data processing apparatus 700 is application software; and the blockchain data processing apparatus 700 may be configured to perform relevant steps of the blockchain data processing method provided in the embodiments of this disclosure.

The blockchain data processing apparatus 700 is applied to the consensus node in a blockchain. The consensus node stores n groups of encrypted data, the n groups of encrypted data are obtained by encrypting service data by service nodes, and n is a positive integer greater than 1. The blockchain data processing apparatus 700 includes:

an acquisition unit 701, configured to acquire service updating data of the n groups of encrypted data, the service updating data being obtained by encrypting primary key information of the n groups of encrypted data;

a processing unit 702, configured to perform data intersection on the service updating data to obtain service intersection data; and a transmission unit 703, configured to transmit the service intersection data to the service node to cause the service node to parse the service intersection data to obtain to-be-supplemented plain-text data, the to-be-supplemented plain-text data being data that the service node lacks.

In some embodiments, the processing unit 702 is further configured to perform the following operations:

acquire a data authorization request for a smart contract authorization interface transmitted by a target service node, the target service node being any one of n service nodes, the data authorization request including node information of at least one reference service node, the reference node being a service node having data updating permission for the target encrypted data among the n service nodes, the target encrypted data being obtained by encrypting the service data by the target service node; and determine that at least one reference service node has the permission to update the target encrypted data in response to the data authorization request.

In some embodiments, the target encrypted data is stored in a data structure of primary key K-value V, and the value information of the target encrypted data is generated according to the service data of the target service node; the target encrypted data is any one of the n groups of encrypted data; and the primary key information of the target encrypted data is obtained by encrypting a curve point mapped by the target service node on an elliptic curve through a secret key of the target service node; and the curve point mapped by the target service node on the elliptic curve is generated based on an object address acquired by the target service node.

In some embodiments, the n groups of encrypted data are generated by the n service nodes, the service nodes are in one-to-one correspondence to the encrypted data, and the n service nodes include first service nodes and second service nodes; the first service node corresponds to the first encrypted data, and the second service node corresponds to the second encrypted data; the acquired service updating data includes the first service updating data and the second service updating data;

the first service updating data is obtained after the second service node encrypts the primary key information of the first encrypted data based on a private key of the second service node; and the second service updating data is obtained after the first service node encrypts second initial service updating data based on a public and a secret exchange algorithm of the second service node, and the second initial service updating data is obtained after the first service node encrypts the primary key information of the second encrypted data based on the private key of the first service node.

In some embodiments, the n groups of encrypted data are generated by the n service nodes, the service nodes are in one-to-one correspondence to the encrypted data, and the n service nodes include first service nodes and second service nodes; the first service node corresponds to the first encrypted data, and the second service node corresponds to the second encrypted data; the acquired service updating data includes the first service updating data and the second service updating data;

the first service updating data is obtained after the second service node encrypts first initial service updating data based on the public key and the secret key exchange algorithm of the first service node, and the first initial service updating data is obtained after the second service node encrypts the primary key information of the first encrypted data based on the private key of the second service node; and the second service updating data is obtained after the first service node encrypts the primary key information of the second encrypted data based on the private key of the first service node.

In some embodiments, the processing unit 702 is configured to perform the following operations:

acquire the service updating data with the same primary key information from the service updating data of the n groups of encrypted data; and combine the acquired service updating data with the same primary key information into the service intersection data.

In the embodiment of this disclosure, for the service data constructed based on the key-value pair, after the primary key information is encrypted and updated, by performing intersection on the service updating data after the encrypted data is updated, the intersection processing on the service data of different service nodes may be ensured, so that each service node may share the to-be-supplemented plain-text data from the service intersection data; and compared with the method of manually screening and exchanging data from various datasets, this disclosure may automatically realize the service data sharing among different service nodes, so that the data exchange function of the same service data may be completed rapidly.

Figure 8:
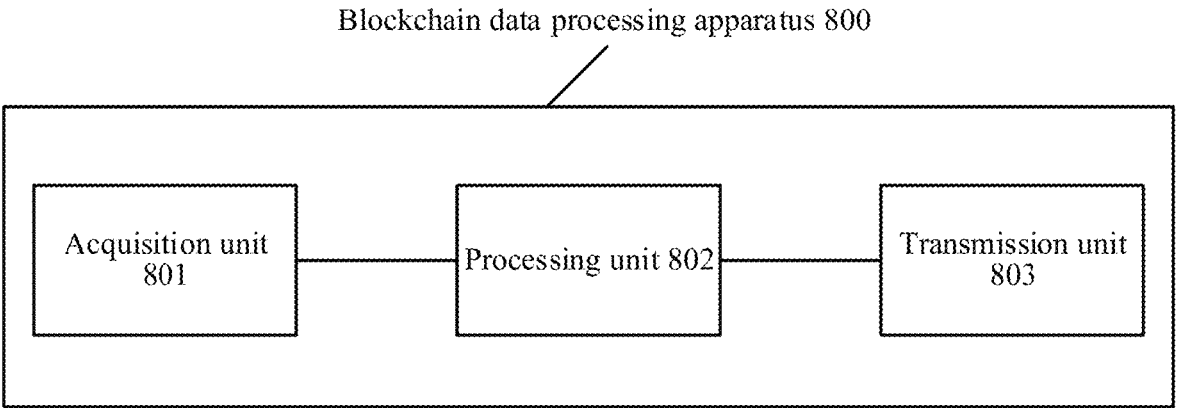
FIG. 8 is a schematic structural diagram of another blockchain data processing apparatus according to an embodiment of this disclosure.

FIG. 8 is a schematic structural diagram of another blockchain data processing apparatus according to an embodiment of this disclosure. The blockchain data processing apparatus 800 may be applied to a service node in the aforementioned embodiment. The blockchain data processing apparatus 800 may be a computer program (including a program code) run in a computer device, for example, the blockchain data processing apparatus 800 is application software; and the blockchain data processing apparatus 800 may be configured to perform relevant steps of the blockchain data processing method provided in the embodiments of this disclosure.

The blockchain data processing apparatus 800 is applied to a target service node among n service nodes in a blockchain, where the service node is configured to store encrypted data into a consensus node, the n service nodes include a target service node and a plurality of reference service nodes except the target service node, and n is a positive integer greater than 1; and the blockchain data processing apparatus 800 includes:

an acquisition unit 801, configured to acquire the encrypted data of the n service nodes stored in the consensus node;

a processing unit 802, configured to perform data encryption on the primary key information of encrypted data of any reference service node to obtain the service updating data of the reference service node; and a transmission unit 803, configured to transmit the service updating data of the reference service node to the consensus node, and determine, by the consensus node, the service intersection data based on the service updating data of the reference service node and the service updating data transmitted by other service nodes to the consensus node.

The processing unit 802 is further configured to acquire the service intersection data from the consensus node, and determine to-be-supplemented plain-text data based on the service intersection data, and the to-be-supplemented plain-text data is data that the target service node lacks.

In some embodiments, the processing unit 802 is further configured to perform the following operations:

transmit a data authorization request for a smart contract authorization interface to the consensus node, the data authorization request including node information of at least one reference service node, where the data authorization request is used for triggering the consensus node to determine that at least one reference service node has the permission to update the target encrypted data, and the target encrypted data is obtained by encrypting the service data by the target service node.

In some embodiments, the processing unit 802 is configured to perform the following operations:

encrypt primary key information of the encrypted data of the reference service node through a secret key of the target service node to obtain the service updating data of the encrypted data of the reference service node.

In some embodiments, the processing unit 802 is configured to perform the following operations:

encrypt the primary key information of the encrypted data of the reference service node through the secret key of the target service node to obtain the reference updating data; and encrypt the reference updating data based on a public key and a secret key exchange algorithm of the reference service node to generate the service updating data of the encrypted data of the reference service node.

In some embodiments, the processing unit 802 is configured to perform the following operations:

parse the service intersection data based on the private key of the target service node to obtain target parsed intersection data;

transmit the target parsed intersection data to the consensus node;

receive reference parsed intersection data transmitted by the consensus node, the reference parsed intersection data being obtained after the consensus node parses the service intersection data based on the private key of the reference service node; and decrypt the reference parsed intersection data according to the private key of the target service node to obtain to-be-supplemented plain-text data of the target service node.

In some embodiments, the target encrypted data is stored in a data structure of a primary key (K)-value (V); and the processing unit 802 is further configured to perform the following operations:

map an object address acquired by the target service node to a target curve point on an elliptic curve;

acquire the secret key of the target service node;

encrypt the target curve point based on the secret key of the target service node to obtain the primary key information of the target service node; and generate target encrypted data based on the primary key information and the service data of the target service node.

In the above process, except for the target service node (the first service node) and the reference service node (the second service node), no other service node acquires the plain-text data of the service intersection data. Furthermore, for the target service node (the first service node) and the reference service node (the second service node), only the plain-text data of the service intersection data is obtained respectively, and the data outside the intersection cannot be decrypted by the first service node and the second service node either. Therefore, in the embodiment of this disclosure, the process of determining the service intersection data is performed on the blockchain, which ensures the reliability of the service intersection data; and moreover, not all service nodes may decrypt the service intersection data, thereby ensuring the security of the service intersection data.

Figure 9:
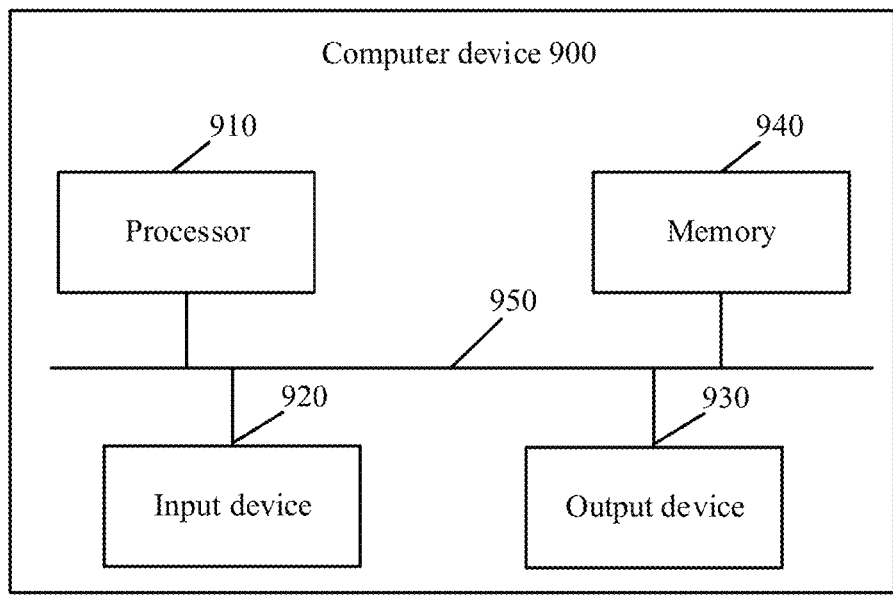
FIG. 9 is a schematic structural diagram of a computer device according to an embodiment of this disclosure.

FIG. 9 is a schematic structural diagram of a computer device according to an embodiment of this disclosure. The computer device 900 is configured to perform steps executed by a consensus node and a service node in the foregoing method embodiments. The computer device 900 includes: processing circuitry, such as one or more processors 910; and one or more input devices 920, one or more output devices 930, and a memory 940. The processor 910, the input device 920, the output device 930, and the memory 940 are connected through a bus 950. The memory 940 is configured to store a computer program, the computer program includes a program instruction, and the processor 910 is configured to invoke the program instruction stored by the memory 940 to perform the following operations:

acquire service updating data of n groups of encrypted data, the service updating data being obtained by encrypting primary key information of the n groups of encrypted data;

perform data intersection on the service updating data to obtain service intersection data; and transmit the service intersection data to the service node to cause the service node to parse the service intersection data to obtain to-be-supplemented plain-text data, the to-be-supplemented plain-text data being data that the service node lacks.

In some embodiments, the processor 910 is further configured to perform the following operations:

acquire a data authorization request for a smart contract authorization interface transmitted by a target service node, the target service node being any one of the n service nodes, the data authorization request including node information of at least one reference service node, the reference node being a service node having data updating permission for the target encrypted data among the n service nodes, the target encrypted data being obtained by encrypting the service data by the target service node; and determine that at least one reference service node has the permission to update the target encrypted data in response to the data authorization request.

In some embodiments, the target encrypted data is stored in a data structure of primary key K-value V, and the value information of the target encrypted data is generated according to the service data of the target service node; and the target encrypted data is any one of the n groups of encrypted data; and the primary key information of the target encrypted data is obtained by encrypting a curve point mapped by the target service node on an elliptic curve through a secret key of the target service node; and the curve point mapped by the target service node on the elliptic curve is generated based on an object address acquired by the target service node.

In some embodiments, the n groups of encrypted data are generated by the n service nodes, the service nodes are in one-to-one correspondence to the encrypted data, and the n service nodes include first service nodes and second service nodes; the first service node corresponds to the first encrypted data, and the second service node corresponds to the second encrypted data; the acquired service updating data includes the first service updating data and the second service updating data;

the first service updating data is obtained after the second service node encrypts the primary key information of the first encrypted data based on the private key of the second service node; and the second service updating data is obtained after the first service node encrypts second initial service updating data based on a public and a secret exchange algorithm of the second service node, and the second initial service updating data is obtained after the first service node encrypts the primary key information of the second encrypted data based on the private key of the first service node.

In some embodiments, the n groups of encrypted data are generated by the n service nodes, the service nodes are in one-to-one correspondence to the encrypted data, and the n service nodes include first service nodes and second service nodes; the first service node corresponds to the first encrypted data, and the second service node corresponds to the second encrypted data; the acquired service updating data includes the first service updating data and the second service updating data;

the first service updating data is obtained after the second service node encrypts first initial service updating data based on the public key and the secret key exchange algorithm of the first service node, and the first initial service updating data is obtained after the second service node encrypts the primary key information of the first encrypted data based on the private key of the second service node; and the second service updating data is obtained after the first service node encrypts the primary key information of the second encrypted data based on the private key of the first service node.

In some embodiments, the processor 910 is configured to perform the following operations:

acquire the service updating data with the same primary key information from the service updating data of the n groups of encrypted data; and combine the acquired service updating data with the same primary key information into the service intersection data.

In some embodiments, the processor 910 is configured to invoke the program instruction stored by the memory 940, and further configured to perform the following operations:

acquire the encrypted data of the n service nodes stored in the consensus node;

perform data encryption on the primary key information of the encrypted data of any reference service node to obtain the service updating data of the reference service node;

transmit the service updating data of the reference service node to the consensus node, and determine, by the consensus node, the service intersection data based on the service updating data of the reference service node and the service updating data transmitted by other service nodes to the consensus node; and acquire the service intersection data from the consensus node, and determine the to-be-supplemented plain-text data based on the service intersection data, the to-be-supplemented plain-text data being data that the target service node lacks.

In some embodiments, the processor 910 is further configured to perform the following operations:

transmit a data authorization request for a smart contract authorization interface to the consensus node, the data authorization request including node information of at least one reference service node, where the data authorization request is used for triggering the consensus node to determine that at least one reference service node has the permission to update the target encrypted data, and the target encrypted data is obtained by encrypting the service data by the target service node.

In some embodiments, the processor 910 is configured to perform the following operations:

encrypt the primary key information of the encrypted data of the reference service node through the secret key of the target service node to obtain the service updating data of the reference service node.

In some embodiments, the processor 910 is configured to perform the following operations:

encrypt the primary key information of the encrypted data of the reference service node through the secret key of the target service node to obtain the reference updating data; and encrypt the reference updating data based on the public key and the secret key exchange algorithm of the reference service node to generate the service updating data of the reference service node.

In some embodiments, the processor 910 is configured to perform the following operations:

parse the service intersection data based on the private key of the target service node to obtain target parsed intersection data;

transmit the target parsed intersection data to the consensus node;

receive reference parsed intersection data transmitted by the consensus node, the reference parsed intersection data being obtained after the consensus node parses the service intersection data based on the private key of the reference service node; and decrypt the reference parsed intersection data according to the private key of the target service node to obtain to-be-supplemented plain-text data of the target service node.

In some embodiments, the target encrypted data is stored in a data structure of primary key K-value V, and the target encrypted data is obtained by encrypting the service data by the target service node; the processor 910 is further configured to perform the following operations:

map an object address acquired by the target service node to a target curve point on an elliptic curve;

acquire the secret key of the target service node;

encrypt the target curve point based on the secret key of the target service node to obtain the primary key information of the target service node; and generate the target encrypted data based on the primary key information and the service data of the target service node.

In the embodiment of this disclosure, for the service data constructed based on the key-value pair, after the primary key information is encrypted and updated, by performing intersection on the service updating data after the encrypted data is updated, the intersection processing on the service data of different service nodes may be ensured, so that each service node may share the to-be-supplemented plain-text data from the service intersection data; and compared with the method of manually screening and exchanging data from various datasets, this disclosure may automatically realize the service data sharing among different service nodes, so that the data exchange function of the same service data may be completed more rapidly.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

It should be noted that an embodiment of this disclosure further provides a computer storage medium, such as a non-transitory computer-readable storage medium, the computer storage medium storing a computer program, the computer program including a program instruction, the computer instruction, when executed by a processor, executing the method in the foregoing embodiments, which is not repeated here. For exemplary technical details that are not disclosed in the computer storage medium embodiments of this disclosure, reference may be made to the descriptions of the method embodiments of this disclosure. As an example, the program instruction may be deployed on a computer device, or on a plurality of computer devices located in a same place, or on a plurality of computer devices distributed in a plurality of places and interconnected through a communication network.

According to an aspect of this disclosure, a computer program product or a computer program is provided. The computer program product or the computer program includes a computer instruction, the computer instruction being stored in a computer-readable storage medium. A processor of the computer device reads the computer instruction from the computer-readable storage medium, and the processor executes the computer instruction to make the computer device execute any of the methods described above.

A person of ordinary skill in the art may understand that all or some of the processes of the methods in the embodiments may be implemented by a computer program instructing relevant hardware. The program may be stored in a computer-readable storage medium, such as a non-transitory computer-readable storage medium. When the program is executed, the procedures of the foregoing method embodiments are performed. The foregoing storage medium may include a magnetic disc, an optical disc, a read-only memory (ROM), a random access memory (RAM), or the like.

What is disclosed above is merely exemplary embodiments of this disclosure which are not intended to limit the scope of this disclosure. Other embodiments shall fall within the scope of this disclosure.

What is claimed is:

1. A blockchain data processing method, comprising:
receiving a plurality of service updating data, each of the plurality of service updating data corresponding to a respective service node of a plurality of service nodes and including:
  encrypted primary key information that is based on at least an object identifier encrypted with secret keys of the plurality of service nodes, and
  encrypted service data that is encrypted with the corresponding secret key of the respective service node;
generating, by processing circuitry, service intersection data associated with the object identifier based on the plurality of service updating data and the encrypted primary key information; and
transmitting the service intersection data to a receiving service node of the plurality of service nodes, the service intersection data including to-be-supplemented data that is absent from the service updating data corresponding to the receiving service node.

2. The method according to claim 1, wherein the encrypted primary key information is based on first primary key information of a first service node of the plurality of service nodes encrypted by a second service node of the plurality of service nodes.

3. The method according to claim 1, further comprising:
acquiring a data authorization request from a first service node of the plurality of service nodes, the data authorization request including node information of a second service node of the plurality of service nodes, the second service node having permission to update encrypted data encrypted by the first service node; and
determining that the second service node has the permission to update the encrypted data in response to the data authorization request.

4. The method according to claim 1, wherein, for one of the plurality of service updating data corresponding to a target service node:
the encrypted primary key information and the encrypted service data are stored in a data structure of primary key K-value V,
the encrypted primary key information is based on a curve point mapped by the target service node on an elliptic curve that is encrypted with the corresponding secret key of the target service node, and
the curve point mapped by the target service node on the elliptic curve is generated based on the object identifier which is an object address acquired by the target service node.

5. The method according to claim 1, wherein
the plurality of service nodes includes a first service node and a second service node,
the plurality of service updating data includes first service updating data corresponding to the first service node and second service updating data corresponding to the second service node,
the first service updating data includes first encrypted service data of the first service node and the encrypted primary key information,
the second service updating data includes second encrypted service data of the second service node and the encrypted primary key information, and
the second service updating data is obtained after second initial service updating data from the second service node is encrypted by the first service node based on a public key and a secret key exchange algorithm.

6. The method according to claim 1, wherein
the plurality of service nodes includes a first service node and a second service node,
the plurality of service updating data includes first service updating data corresponding to the first service node and second service updating data corresponding to the second service node,
the first service updating data includes first encrypted service data of the first service node and the encrypted primary key information,
the second service updating data includes second encrypted service data of the second service node and the encrypted primary key information, and
the first service updating data is obtained after first initial service updating data from the first service node is encrypted by the second service node based on a public key and a secret key exchange algorithm.

7. The method according to claim 1, wherein the service intersection data includes the encrypted service data associated with same encrypted primary key information.

8. A blockchain data processing method, comprising:
receiving first primary key information from a first service node of a plurality of service nodes, the first primary key information being encrypted by the first service node;
performing, by processing circuitry of a second service node of the plurality of service nodes, data encryption on the first primary key information to obtain encrypted primary key information, the encrypted primary key information being encrypted with secret keys of the first service node and the second service node, and the encrypted primary key information being included in first service updating data corresponding to the first service node and second service updating data corresponding to the second service node;
receiving service intersection data from a consensus node, the service intersection data being based on the first service updating data, the second service updating data, and the encrypted primary key information included in the first service updating data and the second service updating data; and
determining, by the processing circuitry of the second service node, to-be-supplemented data from the first service node based on the service intersection data, the to-be-supplemented data being included in the first service updating data and absent from the second service updating data.

9. The method according to claim 8, further comprising:
transmitting a data authorization request to the consensus node, the data authorization request including node information of the first service node,
wherein the data authorization request indicates that the first service node has permission to update target encrypted data, and the target encrypted data includes service data encrypted by the second service node.

10. The method according to claim 8, wherein the performing data encryption comprises:
encrypting the first primary key information with the corresponding secret key of the second service node to obtain the encrypted primary key information.

11. The method according to claim 8, wherein the performing data encryption comprises:
encrypting the first primary key information included in an initial service updating data of the first service node based on a public key and a secret key exchange algorithm.

12. The method according to claim 8, wherein the determining the to-be-supplemented data comprises:

parsing the service intersection data based on a private key of the second service node to obtain parsed intersection data;

transmitting the parsed intersection data to the consensus node;

receiving reference parsed intersection data from the consensus node, the reference parsed intersection data being parsed from the service intersection data by the consensus node based on a private key of the first service node; and decrypting the reference parsed intersection data according to the private key of the second service node to obtain the to-be-supplemented data.

13. The method according to claim 8, further comprising:

mapping an object address acquired by the second service node to a target curve point on an elliptic curve;

encrypting the target curve point based on the corresponding secret key of the second service node to obtain second primary key information of the second service node; and generating the second service updating data based on the second primary key information and service data of the second service node.

14. A blockchain data processing apparatus, comprising: processing circuitry configured to:

receive a plurality of service updating data, each of the plurality of service updating data corresponding to a respective service node of a plurality of service nodes and including:

encrypted primary key information that is based on at least an object identifier encrypted with secret keys of the plurality of service nodes, and encrypted service data that is encrypted with the corresponding secret key of the respective service node;

generate service intersection data associated with the object identifier based on the plurality of service updating data and the encrypted primary key information; and transmit the service intersection data to a receiving service node of the plurality of service nodes, the service intersection data including to-be-supplemented data that is absent from the service updating data corresponding to the receiving service node.

15. The blockchain data processing apparatus according to claim 14, wherein the encrypted primary key information is based on first primary key information of a first service node of the plurality of service nodes encrypted by a second service node of the plurality of service nodes.

16. The blockchain data processing apparatus according to claim 14, wherein the processing circuitry is configured to:

acquire a data authorization request from a first service node of the plurality of service nodes, the data authorization request including node information of a second service node of the plurality of service nodes, the second service node having permission to update encrypted data encrypted by the first service node; and determine that the first service node has the permission to update second encrypted data encrypted by the second service node in response to the data authorization request.

17. The blockchain data processing apparatus according to claim 14, wherein, for one of the plurality of service updating data corresponding to a target service node:

the encrypted primary key information and the encrypted service data are stored in a data structure of primary key K-value V, the encrypted primary key information is based on a curve point mapped by the target service node on an elliptic curve that is encrypted with the secret key of the target service node, and the curve point mapped by the target service node on the elliptic curve is generated based on an object address the object identifier which is acquired by the target service node.

18. The blockchain data processing apparatus according to claim 14, wherein the plurality of service nodes includes a first service node and a second service node, the plurality of service updating data includes first service updating data corresponding to the first service node and second service updating data corresponding to the second service node, the first service updating data includes first encrypted service data of the first service node and the encrypted primary key information, the second service updating data includes second encrypted service data of the second service node and the encrypted primary key information, and the second service updating data is obtained after second initial service updating data from the second service node is encrypted by the first service node based on a public key and a secret key exchange algorithm.

19. The blockchain data processing apparatus according to claim 14, wherein the plurality of service nodes includes a first service node and a second service node, the plurality of service updating data includes first service updating data corresponding to the first service node and second service updating data corresponding to the second service node, the first service updating data includes first encrypted service data of the first service node and the encrypted primary key information, the second service updating data includes second encrypted service data of the second service node and the encrypted primary key information, and the first service updating data is obtained after first initial service updating data from the first service node is encrypted by the second service node based on a public key and a secret key exchange algorithm.

20. The blockchain data processing apparatus according to claim 14, wherein the service intersection data includes the encrypted service data encrypted with same encrypted primary key information.

* * * * *